US012203637B2

(12) United States Patent
Selevan et al.

(10) Patent No.: US 12,203,637 B2
(45) Date of Patent: Jan. 21, 2025

(54) SEQUENTIAL AND COORDINATED FLASHING OF ELECTRONIC ROADSIDE FLARES WITH ACTIVE ENERGY CONSERVATION

(71) Applicant: James R. Selevan, Laguna Beach, CA (US)

(72) Inventors: James R. Selevan, Laguna Beach, CA (US); Daniel Joseph Selevan, Laguna Beach, CA (US)

( * ) Notice: Subject to any disclaimer, the term of this patent is extended or adjusted under 35 U.S.C. 154(b) by 0 days.

(21) Appl. No.: 18/215,399

(22) Filed: Jun. 28, 2023

(65) Prior Publication Data

US 2024/0068650 A1 Feb. 29, 2024

Related U.S. Application Data

(63) Continuation of application No. 17/728,920, filed on Apr. 25, 2022, now Pat. No. 11,698,186, which is a (Continued)

(51) Int. Cl.
*F21L 2/00* (2006.01)
*F21V 23/04* (2006.01)
(Continued)

(52) U.S. Cl.
CPC ............ *F21V 23/0407* (2013.01); *F21L 2/00* (2013.01); *G08B 5/006* (2013.01); *G08G 1/0955* (2013.01);
(Continued)

(58) Field of Classification Search
CPC ............. F21V 23/0407; F21V 23/0471; F21V 21/096; F21V 21/0965; F21V 33/0076;
(Continued)

(56) References Cited

U.S. PATENT DOCUMENTS

| | | | |
|---|---|---|---|
| 3,500,378 A | 3/1970 | Pickering et al. | |
| 3,787,867 A | 1/1974 | Dodge et al. | |

(Continued)

FOREIGN PATENT DOCUMENTS

| | | |
|---|---|---|
| CN | 101038328 A | 9/2007 |
| CN | 102147954 A | 8/2011 |

(Continued)

OTHER PUBLICATIONS

Finley, M.D. et al., "Sequential Warning Light System for Work Zone Lane Closures," Texas Transportation System, (2011) pp. 1-23.

(Continued)

*Primary Examiner* — Laura K Tso
(74) *Attorney, Agent, or Firm* — Robert D. Buyan; Stout, Uxa & Buyan, LLP

(57) ABSTRACT

Electronic light emitting flares and related methods. Flares of the present invention include various features such as self-synchronization, remote control, motion-actuated or percussion-actuated features, dynamic shifting between side-emitting and top-emitting light emitters in response to changes in positional orientation (e.g., vertical vs. horizontal) of the flare; overrides to cause continued emission from side-emitting or top-emitting light emitters irrespective of changes in the flare's positional orientation; use of the flare(s) for illumination of traffic cones and other hazard marking or traffic safety objects or devices, group on/off features, frequency specificity to facilitate use of separate groups of flares in proximity to one another, selection and changing of flashing patterns and others.

23 Claims, 22 Drawing Sheets

Related U.S. Application Data continuation of application No. 16/573,762, filed on Sep. 17, 2019, now Pat. No. 11,313,546, which is a continuation of application No. 15/831,065, filed on Dec. 4, 2017, now Pat. No. 10,443,828, which is a continuation of application No. 14/941,646, filed on Nov. 15, 2015, now Pat. No. 9,835,319, which is a continuation-in-part of application No. 29/525,453, filed on Apr. 29, 2015, now Pat. No. Des. 778,753.

(60) Provisional application No. 62/080,294, filed on Nov. 15, 2014.

(51) Int. Cl.

| | |
|---|---|
| ***F21V 33/00*** | (2006.01) |
| ***F21W 111/02*** | (2006.01) |
| ***F21Y 115/10*** | (2016.01) |
| ***G08B 5/00*** | (2006.01) |
| ***G08G 1/0955*** | (2006.01) |
| ***H05B 45/10*** | (2020.01) |
| ***H05B 45/12*** | (2020.01) |
| ***H05B 47/105*** | (2020.01) |
| ***H05B 47/155*** | (2020.01) |
| ***H05B 47/19*** | (2020.01) |
| ***H05B 47/195*** | (2020.01) |

(52) U.S. Cl.

CPC ........... *H05B 45/10* (2020.01); *H05B 47/105* (2020.01); *H05B 47/19* (2020.01); *F21V 23/0471* (2013.01); *F21V 33/0076* (2013.01); *F21W 2111/02* (2013.01); *F21Y 2115/10* (2016.08); *H05B 45/12* (2020.01); *H05B 47/155* (2020.01); *H05B 47/195* (2020.01)

(58) Field of Classification Search

CPC . F21L 2/00; F21L 4/085; G08B 5/006; G08G 1/0955; F21Y 2115/10; F21W 2111/02

USPC ................. 362/249.02, 153.1, 486, 234, 398

See application file for complete search history.

(56) References Cited

U.S. PATENT DOCUMENTS

| | | | | |
|---|---|---|---|---|
| 3,846,672 | A | 11/1974 | Doughty | |
| 4,132,983 | A | 1/1979 | Shapiro | |
| 4,249,159 | A | 2/1981 | Stasko | |
| 4,345,305 | A | 8/1982 | Kolm et al. | |
| 4,827,245 | A | 5/1989 | Lipman | |
| 4,841,278 | A | 6/1989 | Tezuka et al. | |
| 5,294,924 | A | 3/1994 | Dydzyk | |
| 5,335,112 | A * | 8/1994 | Bennett | G02B 5/124 359/530 |
| 5,345,232 | A | 9/1994 | Robertson | |
| 5,428,546 | A | 6/1995 | Shah et al. | |
| 5,438,495 | A | 8/1995 | Ahlen et al. | |
| 5,551,370 | A | 9/1996 | Hwang | |
| 5,673,039 | A | 9/1997 | Pietzsch et al. | |
| 5,754,124 | A | 5/1998 | Daggett et al. | |
| 6,299,379 | B1 | 10/2001 | Lewis | |
| 6,332,077 | B1 | 12/2001 | Wu et al. | |
| 6,486,797 | B1 | 11/2002 | Laidman | |
| 6,549,121 | B2 | 4/2003 | Povey et al. | |
| 6,614,358 | B1 | 9/2003 | Hutchison et al. | |
| D498,164 | S | 11/2004 | Delich | |
| 6,929,378 | B2 | 8/2005 | Wang | |
| D510,289 | S | 10/2005 | Dueker et al. | |
| 6,963,275 | B2 | 11/2005 | Smalls | |
| D515,957 | S | 2/2006 | Dueker et al. | |
| D515,958 | S | 2/2006 | Dueker et al. | |
| 7,088,222 | B1 | 8/2006 | Dueker et al. | |
| 7,106,179 | B1 * | 9/2006 | Dueker | B60Q 1/52 362/153.1 |
| 7,182,479 | B1 | 2/2007 | Flood et al. | |
| 7,230,546 | B1 | 6/2007 | Nelson et al. | |
| 7,277,809 | B1 | 10/2007 | DeWitt, Jr. et al. | |
| 7,298,244 | B1 | 11/2007 | Cress et al. | |
| 7,301,469 | B1 | 11/2007 | Hoffman et al. | |
| D560,533 | S | 1/2008 | Dueker et al. | |
| D564,387 | S | 3/2008 | Rubin et al. | |
| 7,455,419 | B2 | 11/2008 | Helget et al. | |
| 7,563,158 | B2 | 7/2009 | Haschke et al. | |
| D631,582 | S | 1/2011 | Hwang | |
| 8,061,866 | B2 | 11/2011 | Torre Sarmiento | |
| 8,072,345 | B2 | 12/2011 | Gallo | |
| D654,387 | S | 2/2012 | Wilson et al. | |
| 8,154,424 | B2 | 4/2012 | Selevan | |
| 8,220,950 | B1 | 7/2012 | Sunshine | |
| D669,805 | S | 10/2012 | Edwards et al. | |
| D678,100 | S | 3/2013 | Hwang | |
| 8,456,325 | B1 | 6/2013 | Sikora | |
| 8,550,653 | B2 | 10/2013 | Wilson et al. | |
| 8,554,456 | B2 | 10/2013 | Brant et al. | |
| 8,564,456 | B2 | 10/2013 | Selevan | |
| 8,579,460 | B2 | 11/2013 | Wilson et al. | |
| 8,602,584 | B2 | 12/2013 | Ghafoori et al. | |
| 8,643,511 | B1 | 2/2014 | Batterson | |
| 8,672,517 | B2 | 3/2014 | Chung et al. | |
| 8,770,774 | B2 | 7/2014 | Ye et al. | |
| 8,786,461 | B1 | 7/2014 | Daudelin | |
| 8,949,022 | B1 | 2/2015 | Fahrner et al. | |
| 9,066,383 | B2 | 6/2015 | Gerszberg | |
| 9,122,966 | B2 | 9/2015 | Glaser | |
| 9,288,088 | B1 | 3/2016 | McIlroy | |
| 9,437,109 | B1 | 9/2016 | Stafford et al. | |
| 9,489,809 | B1 | 11/2016 | Dever et al. | |
| D778,752 | S | 2/2017 | Selevan | |
| D778,753 | S | 2/2017 | Selevan | |
| 9,835,319 | B2 | 12/2017 | Selevan et al. | |
| 10,066,808 | B2 | 9/2018 | Fernando | |
| 10,443,828 | B2 | 10/2019 | Selevan et al. | |
| 10,551,014 | B2 | 2/2020 | Selevan et al. | |
| 11,162,650 | B2 | 11/2021 | Selevan et al. | |
| 11,231,150 | B2 | 1/2022 | Selevan et al. | |
| 11,313,546 | B2 | 4/2022 | Selevan et al. | |
| 11,698,186 | B2 * | 7/2023 | Selevan | G08B 5/006 362/486 |
| 2002/0006313 | A1 | 1/2002 | Pas | |
| 2002/0008637 | A1 | 1/2002 | Lemelson et al. | |
| 2002/0036908 | A1 | 3/2002 | Pederson | |
| 2002/0067290 | A1 | 6/2002 | Peet, II et al. | |
| 2002/0115423 | A1 | 8/2002 | Hatae et al. | |
| 2002/0154787 | A1 | 10/2002 | Rice et al. | |
| 2002/0159251 | A1 | 10/2002 | Hart | |
| 2002/0175831 | A1 | 11/2002 | Bergan et al. | |
| 2003/0164666 | A1 | 9/2003 | Crunk | |
| 2004/0056779 | A1 | 3/2004 | Rast | |
| 2004/0100396 | A1 | 5/2004 | Antico et al. | |
| 2004/0113817 | A1 | 6/2004 | Novak et al. | |
| 2004/0124993 | A1 | 7/2004 | George | |
| 2004/0183694 | A1 | 9/2004 | Bauer | |
| 2004/0263330 | A1 | 12/2004 | Alarcon | |
| 2004/0264440 | A1 | 12/2004 | Wan et al. | |
| 2005/0040970 | A1 | 2/2005 | Hutchins et al. | |
| 2005/0134478 | A1 | 6/2005 | Mese et al. | |
| 2005/0210722 | A1 | 9/2005 | Graef et al. | |
| 2005/0248299 | A1 | 11/2005 | Chemel et al. | |
| 2005/0254246 | A1 | 11/2005 | Huang | |
| 2006/0072306 | A1 | 4/2006 | Woodyard | |
| 2006/0097882 | A1 | 5/2006 | Brinkerhoff et al. | |
| 2006/0104054 | A1 | 5/2006 | Coman | |
| 2006/0165025 | A1 | 7/2006 | Singh et al. | |
| 2007/0038743 | A1 | 2/2007 | Hellhake et al. | |
| 2007/0099625 | A1 | 5/2007 | Rosenfeld | |
| 2007/0115139 | A1 | 5/2007 | Witte et al. | |
| 2007/0153520 | A1 | 7/2007 | Curran et al. | |
| 2007/0155139 | A1 | 7/2007 | Hecht et al. | |
| 2007/0194906 | A1 | 8/2007 | Sink | |
| 2007/0222638 | A1 | 9/2007 | Chen et al. | |
| 2007/0222640 | A1 | 9/2007 | Guelzow et al. | |
| 2007/0250212 | A1 | 10/2007 | Halloran et al. | |
| 2007/0273509 | A1 | 11/2007 | Gananathan | |

(56) References Cited

U.S. PATENT DOCUMENTS

| | | | |
|---|---|---|---|
| 2007/0273552 | A1 | 11/2007 | Tischer |
| 2008/0037431 | A1 | 2/2008 | Werb et al. |
| 2008/0042866 | A1 | 2/2008 | Morse et al. |
| 2008/0074289 | A1 | 3/2008 | Sauder et al. |
| 2008/0091304 | A1 | 4/2008 | Ozick et al. |
| 2008/0122607 | A1 | 5/2008 | Bradley |
| 2008/0122656 | A1 | 5/2008 | Carani et al. |
| 2008/0150758 | A1 | 6/2008 | Vallejo Sr. |
| 2008/0198038 | A1 | 8/2008 | Yingst et al. |
| 2008/0242220 | A1 | 10/2008 | Wilson et al. |
| 2008/0267259 | A1 | 10/2008 | Budampati et al. |
| 2009/0009406 | A1 | 1/2009 | Chu et al. |
| 2009/0034258 | A1 | 2/2009 | Tsai et al. |
| 2009/0034419 | A1 | 2/2009 | Flammer, III et al. |
| 2009/0063030 | A1 | 3/2009 | Howarter et al. |
| 2009/0115336 | A1 | 5/2009 | Wang |
| 2009/0174572 | A1 | 7/2009 | Smith |
| 2009/0187300 | A1 | 7/2009 | Everitt |
| 2010/0109898 | A1 | 5/2010 | Kensy et al. |
| 2010/0259199 | A1 | 10/2010 | McDermott |
| 2011/0010094 | A1 | 1/2011 | Simon |
| 2011/0128161 | A1 | 6/2011 | Bae et al. |
| 2011/0249430 | A1 | 10/2011 | Stamatatos et al. |
| 2011/0249688 | A1 | 10/2011 | Liu |
| 2011/0298603 | A1 | 12/2011 | King et al. |
| 2012/0020060 | A1 | 1/2012 | Myer et al. |
| 2012/0051056 | A1 | 3/2012 | Derks et al. |
| 2012/0139425 | A1 | 6/2012 | Kim |
| 2012/0249341 | A1 | 10/2012 | Brown et al. |
| 2012/0256765 | A1 | 10/2012 | Selevan |
| 2012/0277934 | A1 | 11/2012 | Ohtomo et al. |
| 2012/0287611 | A1 | 11/2012 | Wilson et al. |
| 2013/0113634 | A1 | 5/2013 | Hutchinson et al. |
| 2013/0114268 | A1 | 5/2013 | Shigematsu et al. |
| 2013/0166193 | A1 | 6/2013 | Goldman et al. |
| 2013/0214924 | A1 | 8/2013 | Ko |
| 2013/0221852 | A1 | 8/2013 | Bowers et al. |
| 2013/0260695 | A1 | 10/2013 | Wang |
| 2013/0271294 | A1 | 10/2013 | Selevan |
| 2013/0293396 | A1 | 11/2013 | Selevan |
| 2014/0071681 | A1 | 3/2014 | Ghafoori et al. |
| 2014/0126187 | A1 | 5/2014 | Bennett et al. |
| 2014/0210373 | A1 | 7/2014 | Baret |
| 2015/0009682 | A1 | 1/2015 | Clough |
| 2015/0077234 | A1 | 3/2015 | Fullam |
| 2015/0117010 | A1 | 4/2015 | Auen |
| 2015/0330616 | A1 | 11/2015 | Preuschl et al. |
| 2015/0338079 | A1 | 11/2015 | Preuschl et al. |
| 2015/0366275 | A1 | 12/2015 | Cserfoi |
| 2015/0369456 | A1 | 12/2015 | Creusen et al. |
| 2016/0144778 | A1 | 5/2016 | Tucker |
| 2016/0144817 | A1 | 5/2016 | Chambers |
| 2016/0174099 | A1 | 6/2016 | Goldfain |
| 2016/0186971 | A1 | 6/2016 | Selevan et al. |
| 2016/0248506 | A1 | 8/2016 | Ryan et al. |
| 2017/0097128 | A1 | 4/2017 | Stafford |
| 2017/0151994 | A1 | 6/2017 | Braunberger |
| 2017/0160392 | A1 | 6/2017 | Brisimitzakis et al. |
| 2017/0287217 | A1 | 10/2017 | Kim et al. |
| 2017/0354019 | A1 | 12/2017 | Julian et al. |
| 2017/0355300 | A1 | 12/2017 | Kurata |
| 2018/0079463 | A1 | 3/2018 | Pearce |
| 2018/0165965 | A1 | 6/2018 | Ewert et al. |
| 2019/0018132 | A1 | 1/2019 | Decker et al. |
| 2019/0132709 | A1 | 5/2019 | Graefe et al. |
| 2021/0237777 | A1 | 8/2021 | Selevan et al. |

FOREIGN PATENT DOCUMENTS

| | | | |
|---|---|---|---|
| CN | 105812673 | A | 7/2016 |
| DE | 102008011228 | A1 | 8/2009 |
| EP | 1531444 | A2 | 5/2005 |
| JP | 03-162279 | A | 7/1991 |
| JP | 06-024012 | U | 3/1994 |
| JP | UP11260102 | A | 9/1999 |
| JP | 2005-019013 | A | 1/2005 |
| JP | 3108195 | U | 4/2005 |
| JP | 2005113636 | A | 4/2005 |
| JP | 2007501971 | A | 2/2007 |
| JP | 2010/157213 | A | 7/2010 |
| JP | 2010221874 | A | 10/2010 |
| JP | 2014130409 | A | 7/2014 |
| JP | 3208109 | U | 12/2016 |
| JP | 2017092652 | A | 5/2017 |
| TW | 201528878 | A | 7/2015 |
| WO | WO 98/21519 | A1 | 5/1998 |
| WO | WO 2003/026358 | A1 | 3/2003 |
| WO | WO2005/015520 | A1 | 2/2005 |
| WO | WO 2007/030852 | A1 | 3/2007 |
| WO | WO 2009/111184 | A2 | 9/2009 |
| WO | WO2012/002163 | A1 | 1/2012 |
| WO | WO2012/064951 | A2 | 5/2012 |
| WO | WO 2014/099953 | A1 | 6/2014 |
| WO | WO 2014/115541 | A1 | 7/2014 |
| WO | WO 2014/130842 | A1 | 8/2014 |
| WO | WO 2016/070193 | A1 | 5/2016 |
| WO | WO2016/077812 | A1 | 5/2016 |
| WO | WO2021/104031 | A1 | 6/2021 |

OTHER PUBLICATIONS

Sun, C. et al., "Cost-Benefit Analysis of Sequential Warning Lights in Nighttime Work Zone Tapers", University of Missouri, Report to the Smart Work Zone Deployment Initiative, Jun. 6, 2011.

Internet Website Screen Capture, www.empco-lite.com; Sep. 6, 2010.

PCT International Search Report dated Apr. 27, 2018 in PCT Application No. PCT/US2018/017683.

International Search Report and Written Opinion dated May 28, 2014 in PCT Application US2014/017756. International Filing Date Feb. 21, 2014.

PCT International Search Report dated Mar. 18, 2016 in PCT Application No. PCT/US2015/060770.

PCT International Search Report dated Oct. 26, 2018 in related PCT Application No. PCT/US2018/041126.

Extended European Search Report dated Jun. 20, 2018 in related European Application No. 15858697.4.

Office Action Dated Oct. 23, 2019 in related Japanese Patent Application No. 2017-544855.

Non-Final Office Action Dated Mar. 17, 2011 in U.S. Appl. No. 12/381,565.

Non-Final Office Action Dated Nov. 8, 2012 in U.S. Appl. No. 13/440,930.

Non-Final Office Action Dated Oct. 8, 2014 in U.S. Appl. No. 13/774,029.

Non-Final Office Action Dated Aug. 11, 2014 in U.S. Appl. No. 13/775,177.

Final Office Action Dated May 8, 2015 in U.S. Appl. No. 13/774,029.

Final Office Action Dated Mar. 30, 2015 in U.S. Appl. No. 13/775,177.

Non-Final Office Action Dated Sep. 18, 2015 in U.S. Appl. No. 13/775,177.

Non-Final Office Action Dated Mar. 25, 2015 in U.S. Appl. No. 14/186,582.

Non-Final Office Action Dated Jan. 7, 2020 in U.S. Appl. No. 16/522,282.

Non-Final Office Action Dated Jan. 17, 2020 in U.S. Appl. No. 16/573,762.

Non-Final Office Action Dated Jan. 22, 2019 in U.S. Appl. No. 16/029,379.

Final Office Action Dated Sep. 5, 2019 in U.S. Appl. No. 16/029,379.

Non-Final Office Action Dated Nov. 30, 2016 in U.S. Appl. No. 15/177,192.

Non-Final Office Action Dated Apr. 19, 2017 in U.S. Appl. No. 14/941,646.

Non-Final Office Action Dated May 11, 2018 in U.S. Appl. No. 15/831,065.

Final Office Action Dated Dec. 27, 2018 in U.S. Appl. No. 15/831,065.

Final Office Action Dated Apr. 30, 2020 in U.S. Appl. No. 16/522,282.

(56) References Cited

OTHER PUBLICATIONS

Extended European Search Report dated Dec. 2, 2020 in related European Application No. 18751574.7.
Car 2 Car Communications Consortium: "Car 2 Car Communication Consortium Manifesto; Overview of the C2C-CC System, Version 1.1", Internet Citation, Aug. 2007, pp. 1-94, Retrieved from the Internet: URL:http://www.car-to-car.org/fileadmin/downloads/C2C-CC_manifesto.v1.1.pdf.
Jiang, Daniel et al., "Design of 5.9 ghz dsrc-based vehicular safety communication", IEEE Wireless Communications, Coordinated Science Laboratory; Dept. Electrical and Computer Engineering, University of Illinois at Urbana-Champaign, US, vol. 13, No. 5, Oct. 2006, pp. 36-43.
Caveney, Derek,"Cooperative Vehicular Safety Applications", IEEE Control Systems Magazine, IEEE Service Center, Piscataway, NJ, US, vol. 30, No. 4, Aug. 2010, pp. 38-53.
Boukerche, A. et al, "Vehicular Ad Hoc Networks: A New Challenge for Localization-Based Systems", Computer Communications, Elsevier Science Publishers, vol. 31, No. 12, Jul. 2008, pp. 2838-2849.
Rola Naja, "Wireless Vehicular Networks for Car Collision Avoidance", in "Wireless Vehicular Networks for Car Collision Avoidance", May 2013, Springer Verlag, retrieved from the Internet: URL:https://www.springer.com/de/book/9871441995629.
Extended European Search Report dated Mar. 2, 2021 in related European Application No. 18828265.1.
Office Action Dated Mar. 3, 2021 in corresponding Chinese Patent Application No. 201880057575.3.
PCT International Search Report dated Jul. 22, 2021 in PCT Application No. PCT/US2021/012872.
Office Action Dated Oct. 21, 2021 in corresponding European Patent Application No. 18751574.7.
Office Action Dated Oct. 11, 2021 in corresponding Chinese Patent Application No. 201880057575.3.
Office Action Dated Jan. 11, 2022 in related Japanese Patent Application No. 2019-543284.
Liu, Zhitian et al., "Efficient Single-Layer White Light-Emitting Devices Based on Silole-Containing Polymers," Journal of Display Technology, Mar. 2013.
Office Action Dated Feb. 7, 2023 in related Japanese Patent Application No. 2022-068386.
Office Action Dated May 9, 2023 in related Japanese Patent Application No. 2020-521857.
PCT International Search Report dated Apr. 26, 2023 in related PCT Application No. PCT/US2022/054158.
PCT International Search Report dated Jul. 14, 2023 in related PCT Application No. PCT/US2023/012840.

* cited by examiner

SEQUENTIAL AND COORDINATED FLASHING OF ELECTRONIC ROADSIDE FLARES WITH ACTIVE ENERGY CONSERVATION

RELATED APPLICATIONS

This patent application is a continuation of copending U.S. patent application Ser. No. 17/728,920 filed Apr. 25, 2022 and issuing on Jul. 11, 2023 as U.S. Pat. No. 11,698,186, which is a continuation of U.S. patent application Ser. No. 16/573,762 filed Sep. 17, 2019 and issued on Apr. 26, 2022 as U.S. Pat. No. 11,313,546, which is a continuation of U.S. patent application Ser. No. 15/831,065 filed Dec. 4, 2017 and issued on Oct. 15, 2019 as U.S. Pat. No. 10,443,828, which is a continuation of U.S. patent application Ser. No. 14/941,646 filed Nov. 15, 2015 and issued on Dec. 5, 2017 as U.S. Pat. No. 9,835,319, which claims priority to U.S. Provisional Patent Application No. 62/080,294 filed Nov. 15, 2014 and which is also a continuation in part of United States Design Patent Application Ser. No. 29/525,453 filed Apr. 29, 2015 and issued on Feb. 14, 2017 as United States Design Pat. No. D778753, the entire disclosure of each such prior patent and application expressly incorporated herein by reference.

FIELD OF THE INVENTION

The present invention relates generally to the fields of electronics and traffic engineering and more particularly to flare devices and methods for marking hazards or intended routes of travel on roadways and the like.

BACKGROUND OF THE INVENTION

Pursuant to 37 CFR 1.71(e), this patent document contains material which is subject to copyright protection and the owner of this patent document reserves all copyright rights whatsoever.

Flashing orange traffic safety lamps are commonplace along highways and waterways. Passive cones are often used to mark the boundaries or edges of roadways. They are used during road construction, traffic detours, and for emergency to route traffic through unfamiliar redirection. These passive cones are typically used over an entire 24-hour period, which includes darkness and may include poor visibility. Always on, or blinking, lights or reflectors are often used to define the border of a road that has temporarily changed and no longer follows the path that drivers expect or have become use to seeing.

Traffic is often controlled using large, trailer-like signs with electric generators or photocells that are towed behind a vehicle and left at the detour site. These signs create a large arrow that directs traffic, but the arrow does not guide the driver around a curve or through unfamiliar road courses. Similarly, nautical traffic entering a harbor is guided via buoys and shore-based lights, which when set upon the backdrop of terrestrial lighting, can be confusing. Similarly, emergency or temporary aircraft runways for military, civilian, police, and Coast Guard air equipment, both fixed wing and rotary wing, lack proper sequenced lights that designate direction and location of the runway. This invention provides a system that is both low in cost and easy to implement, one that can be deployed quickly when necessary to aid aviators when landing or taking off on open fields or highways.

Also, traditional magnesium-flame roadside flares are sometimes used by first responders and workers to alert drivers to the presence of an emergency or maintenance event. There has been movement away from use of flame flares as they result in fire danger, pollution, and toxic fumes. Electronic flares that shine brightly on the roadside have begun to replace these ignited devices. However, frequently during a maintenance or emergency event there are numerous vehicles with roof-top and bumper-level red, orange, blue lamps flashing. This “light noise” can introduce confusion to an approaching driver.

In recent years, electronic roadside flares have been developed as alternatives to magnesium flame flares, reflectors, cones, markers and other previously used flares and marker devices.

SUMMARY OF THE INVENTIONS

The present invention provides new electronic flare devices and their methods of use.

In accordance with the present invention, there is provided an electronic light emitting flare and related methods of use wherein the flare generally comprises; a housing comprising a top wall, bottom wall and at least one side wall, wherein at least a portion of the side wall is translucent; a plurality of light emitters positioned within the housing; a power source; and electronic circuitry connected to the power source and light emitters to drive at least some of the light emitters to emit flashes of light directed through all or translucent portions of the housing side wall. As described herein, the electronic circuitry and/or other components of the flare may be adapted to facilitate various novel features such as self-synchronization, remote control, motion-actuated or percussion-actuated features, dynamic shifting between side-emitting and top-emitting light emitters in response to changes in positional orientation (e.g., vertical vs. horizontal) of the flare; overrides to cause continued emission from side-emitting or top-emitting light emitters irrespective of changes in the flare’s positional orientation; use of the flare(s) for illumination of traffic cones and other hazard marking or traffic safety objects or devices, group on/off features, frequency specificity to facilitate use of separate groups of flares in proximity to one another, selection and changing of flashing patterns, etc.

Each light emitter can emit electromagnetic radiation in the visible range or a range outside the visible spectrum. Such radiation can be in the infrared, ultraviolet, microwave, or radio frequency range. Such radiation can be configured to be received by, and interact with, a receiver in an approaching or departing vehicle that can display the information on a Global Positioning System (GPS) display or other mapping device within the vehicle. Furthermore, each module supporting the visual output devices can comprise a GPS receiver that can provide its position and then transmit that position to the approaching or leaving vehicle such that the information may be used to locate one, a few, or all of the modules on a GPS display or other mapping system.

Still further aspects and details of the present invention will be understood upon reading of the detailed description and examples set forth herebelow.

BRIEF DESCRIPTION OF THE DRAWINGS

The following detailed description and examples are provided for the purpose of non-exhaustively describing some, but not necessarily all, examples or embodiments of the invention, and shall not limit the scope of the invention in any way.

DETAILED DESCRIPTION OF THE INVENTION

Figure 1:
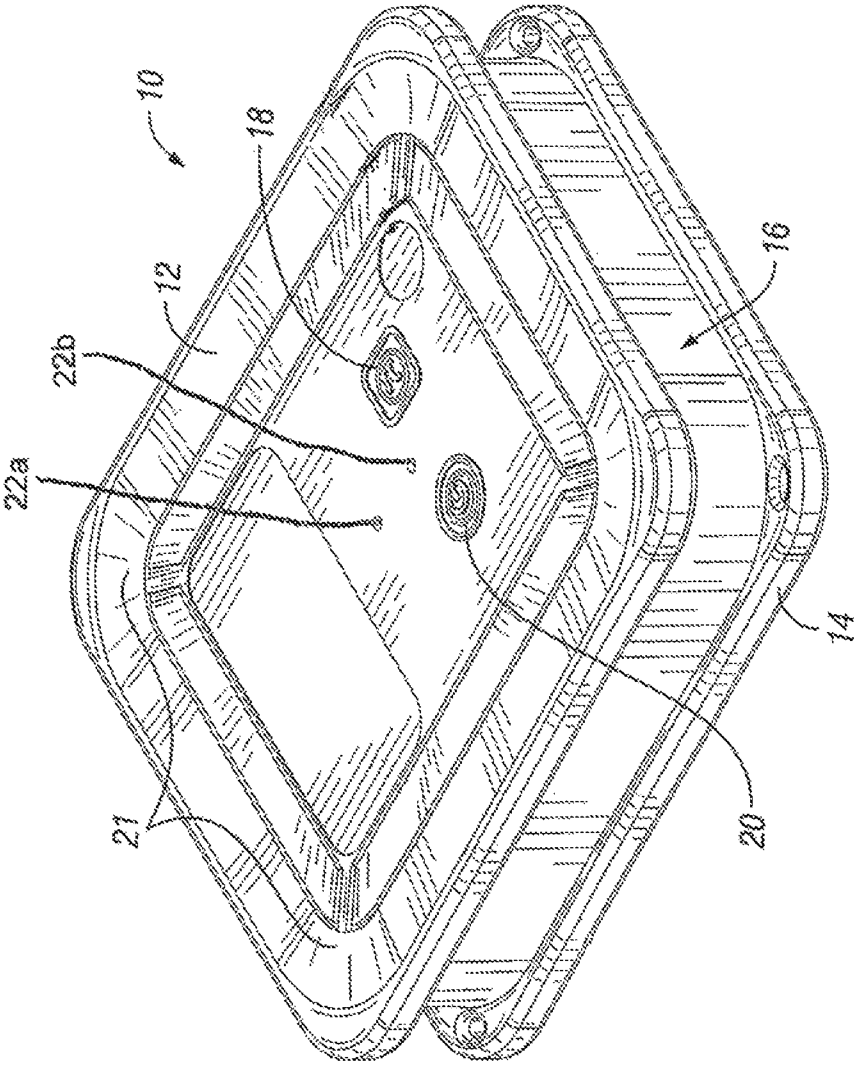
FIG. 1 is a left perspective view of an embodiment of an electronic traffic safety guidance flare.
Figure 2:
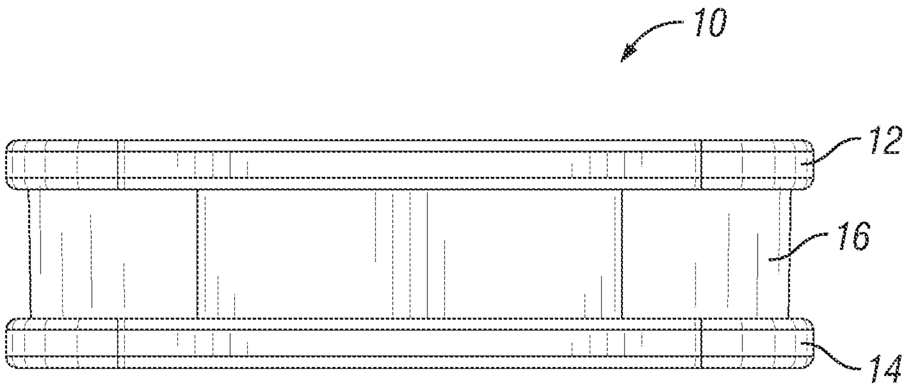
FIG. 2 is a right side view of the embodiment of FIG. 1.
Figure 3:
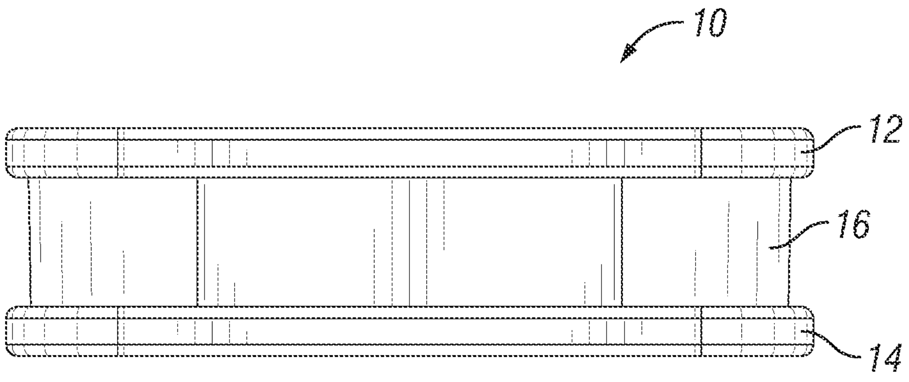
FIG. 3 is a left side view of the embodiment of FIG. 1.
Figure 4:
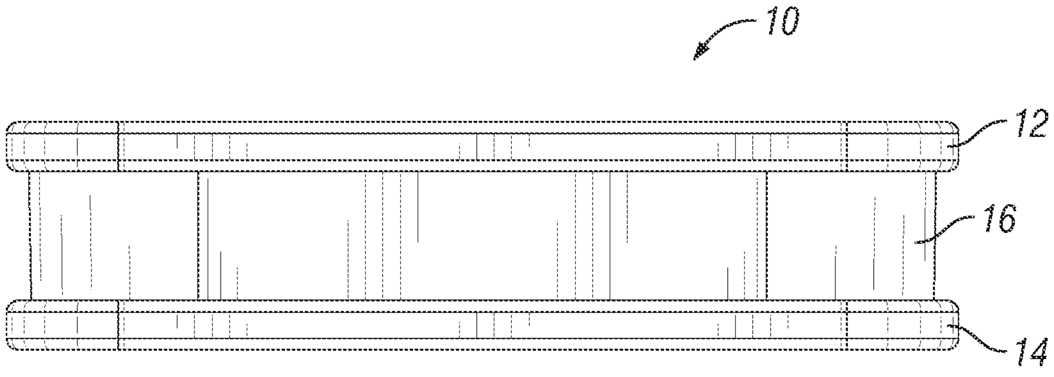
FIG. 4 is a front view of the embodiment of FIG. 1.
Figure 5:
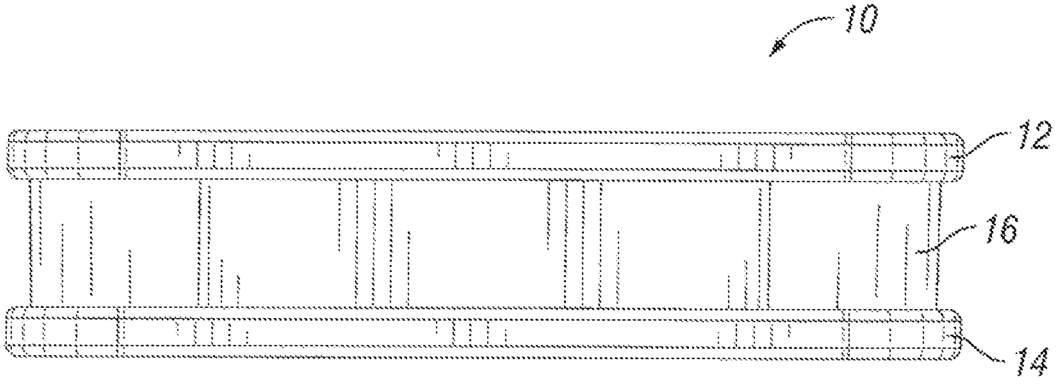
FIG. 5 is a rear view of the embodiment of FIG. 1.
Figure 6:
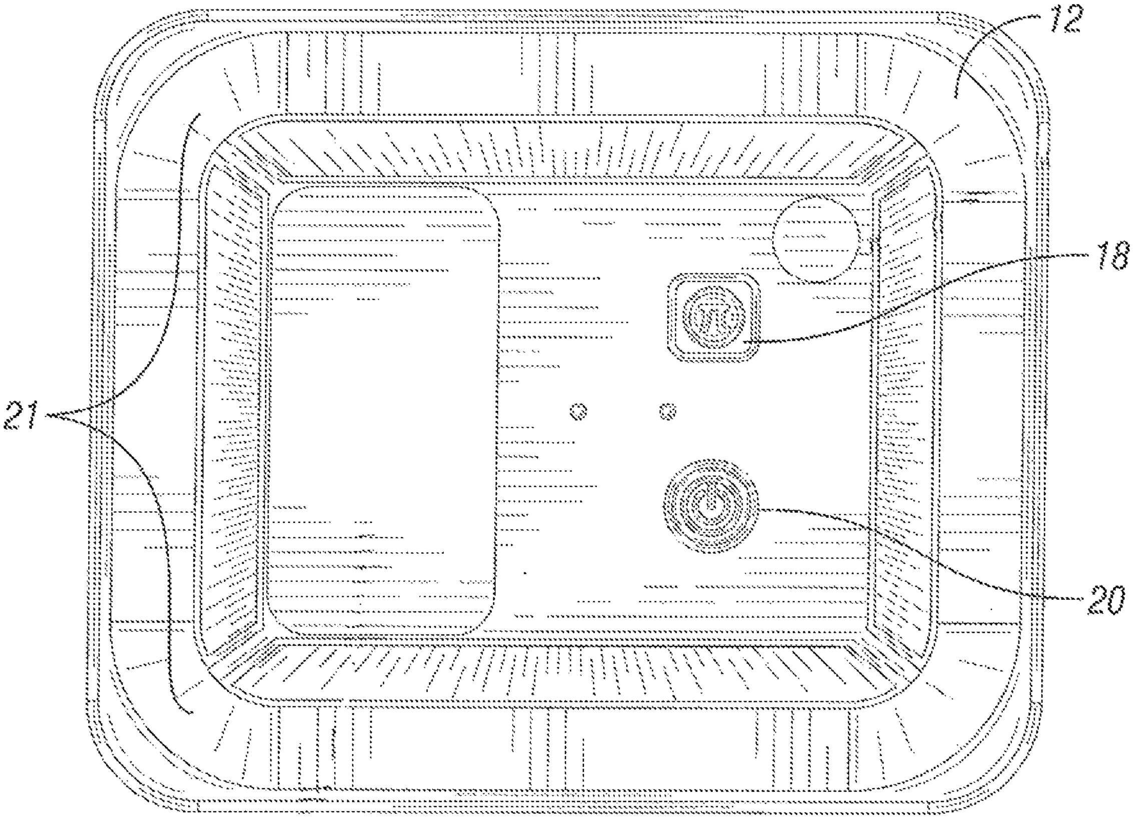
FIG. 6 is a top view of the embodiment of FIG. 1.
Figure 7:
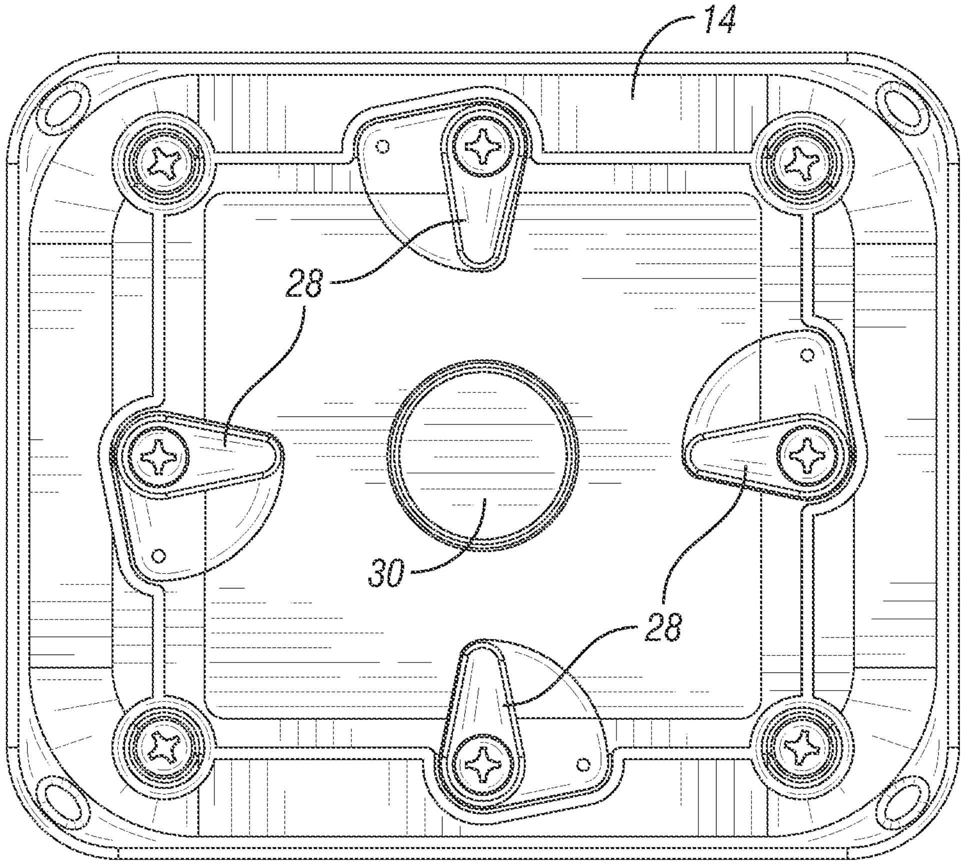
FIG. 7 is a bottom view of the embodiment of FIG. 1.
Figure 8:
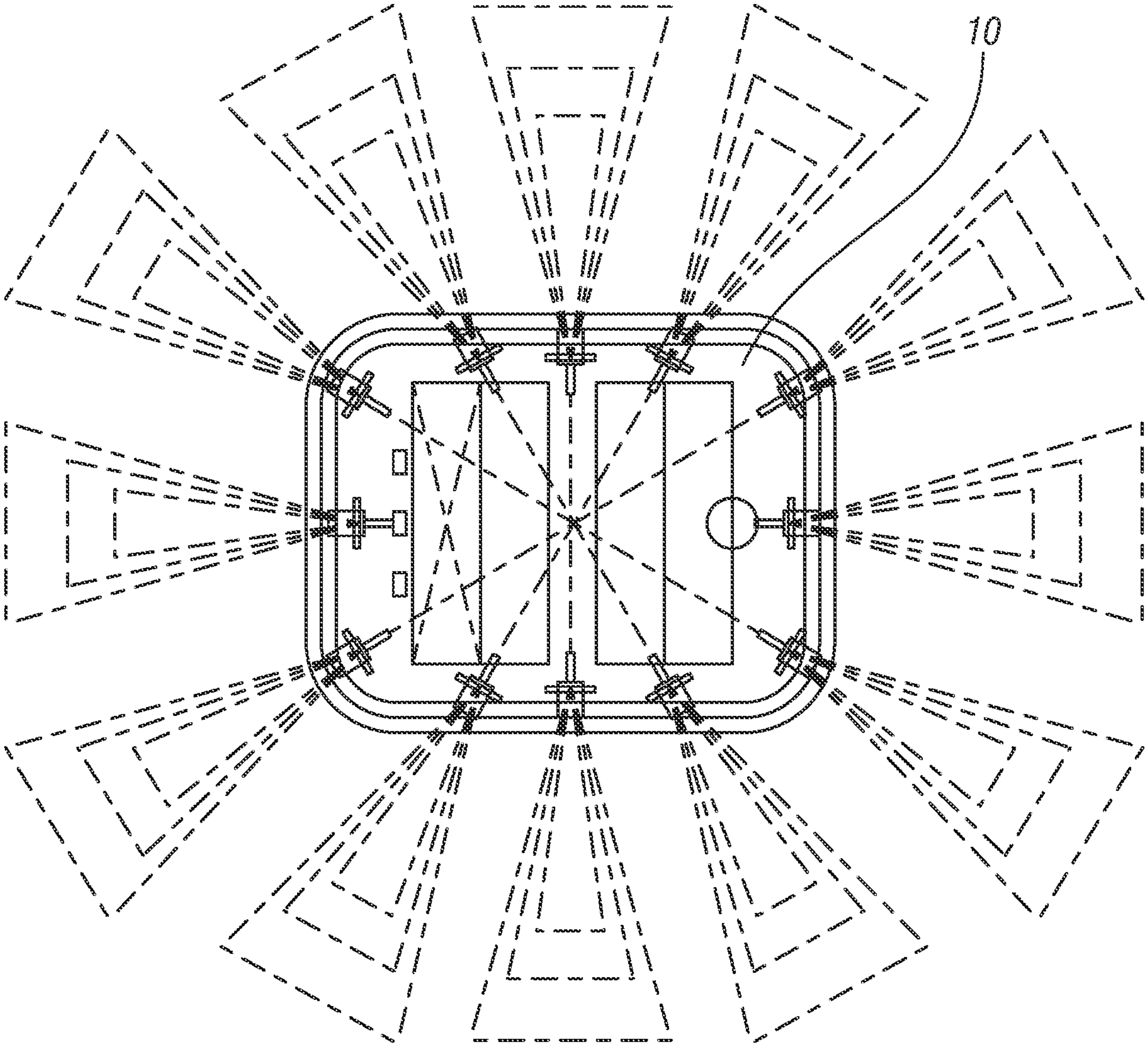
FIG. 8 is a diagram illustrating one example of LED orientation in the flare device of FIGS. 1-7.

The following detailed description and the accompanying drawings to which it refers are intended to describe some, but not necessarily all, examples or embodiments of the invention. The described embodiments are to be considered in all respects only as illustrative and not restrictive. The contents of this detailed description and the accompanying drawings do not limit the scope of the invention in any way.

The ability to coordinate the pattern of illumination between electronic roadside flares enhances the approaching driver's perspective. Sequential flashing provides directional information, while simultaneous flashing provides a more dramatic "warning". One method of coordinating flash timing of roadside flares is to connect them via a single wire. However, this method does introduce the entanglement of the wire in the storage container, the potential for workers to trip over the wire, and delayed deployment.

Wireless coordination of flashing between flares (e.g., causing flares in a row or array to flash in consecutive sequence or other desired pattern) be accomplished using various different modalities, such as radiofrequency transmission, light, or sound waves.

Using a microcontroller, the flare can analyze sensors to establish a communication link. The media through which the information is transferred can be light, sound, or radio waves. The microcontroller will receive information from a radio receiver, light sensor, or sound sensor. Once the information about number and position of other sensors is received the microcontroller can then establish its position in the sequence and broadcast a message that tells other flares where it is in the string, its relative distance, temperature, elevation, etc.

For example, some embodiments of flare devices of the present invention may utilize flocking protocols to facilitate the desired inter-flare communication and function. Examples of flocking protocols are described in copending U.S. patent application Ser. No. 14/186,582 filed Feb. 21, 2014, the entire disclosure of which is expressly incorporated herein by reference.

Also, for example, some embodiments of flare devices of the present invention may utilize mesh networks to facilitate the desired inter-flare communication and function. Examples of such mesh networks are described in U.S. Pat. No. 8,154,424 issued Apr. 10, 2012 as well as United States Patent Application Publications US2013/0293396 published Nov. 17, 2013 and US2013/0271294 published Oct. 17, 2013, the entire disclosure of each such patent and published application being expressly incorporated herein by reference.

Approaches to Inter-Flare Communication: With and without Mesh Network

Light Transmission—Using light as an information transmission media—Light emitted from one flare can represent a message that is received by another flare. This message could be as simple as a "trigger" event to tell the second flare to turn on, or it could be more complex. In the simplest form, presence of light from one flare would trigger an event in another flare. This second flare might delay, for example, 100 milliseconds and then flash. In the ideal setting this could represent a simple method of providing a sequential pattern of flashes. However, it is possible that flare number 4, for example, would receive light from flare number 1 and flash at an inappropriate interval. Thus, the sequential flashing of flares cannot rely upon the simple trigger of a preceding flare. Using the flash of a flare, the message to other flares can be "embedded" within the light signal in a Pulse Width Modulated" scheme. Hence, what appears as a 40 or 100 millisecond (as an example) steady flash of light to the human observer can actually represent a 2, 4, 8, 16, 32, 64 bit or greater word length containing information that would provide coordinating information. The LED and associated drive electronics (microcontroller, transistors, etc.) can respond to signals and voltages that are nanoseconds in length. An 80 millisecond flash of light (appearing as a single flash to the human observer) can actually be made up of a series of thousands of rapid flashes "modulated" on and off so quickly that the human eye cannot discern the pulsed nature of the flash. For example, when the first flare is turned on it could "look" or "listen" for light that contains an identifying message (a digital word representing a "hello, I am a flare flashing". In the absence of seeing such a pattern it would start flashing with a modulated message to the effect, "I am flare number 1". When the second flare is turned on it will "look" for light speaking its same language. It would see light coming from flare 1 defining its sequence number (1). Flare 2 would then turn on and begin flashing with a modulated pattern defining its sequence number and so on.

The transmission of light is inherent in the flash of the flare. Hence, the orange or red or blue or other color LED flashing to alert drivers is also the light source to send the message. On each flare there will be a number of light sensors—photodiodes, photo-resistors, phototransistors, etc. These sensing devices will respond to the presence of any light in their frequencies (sensitivity) range. The photodetector could be chosen or "tuned" to respond to only one color. However, the presence of the digital word modulated in the warning flash eliminates the need to narrow the sensitivity spectrum of light. Any light sensed by the photodetector will represent "noise", but only light modulated with the appropriate digital code will result in the microcontroller responding correctly.

To reduce cost, the physics of the Light Emitting Diode that emits the light (flash) could be used to an advantage by also being used as a light sensor. During the period when the LED is not flashing the voltage on the LED could be reversed. During this period when the voltage is reversed the LED can be used as a light sensor to pick up transmitted light from other flares. This would eliminate or mitigate the need for additional photo-detectors. Furthermore, as there are often 12 or more LEDs on roadside electronic flares, each of these could be used as a photo-detector thereby "looking" in a 360 degree circle. Thus, the orientation of the flare on the roadway is irrelevant; the operator can toss the flares onto the roadway without regard for whether it is pointed in a particular direction to pick up the light beam from an adjacent flare.

Alternatively, light of a specific frequency or spectrum could be used to transmit information. For example, light in the infra-red or ultra-violet frequency range could be used. Photo-detectors sensitive to only these frequencies would filter out "noise" present on the roadway at night. Sunlight (white light) would contain energy in all spectrums, and thus the information content (Pulse Width Modulation) would ensure that light noise does not interfere with the intelligent transfer of information.

Light intensity in addition to color and modulation adds additional information to the microcontroller. As the intensity of light diminishes in a known and predictable way with distance, the "brightness" or intensity of light emanating from a flare can aid in determining sequence. In the simple case of using the flash of a flare as a triggering action, the relative intensity of the received light could "disambiguate" light emitted from two or more flares. If the lights are physically placed in a linear "string" or path and flare number 5 senses light from flare number 4 and number 3, it could identify which is which by measuring the intensity of the light received. It would then be able to identify number 3 (weaker flash therefore farther away) and number 4.

Radio Transmission—Light represents an inexpensive means of transmitting information between flares. However, there are limitations associated with light energy. The transmission of light is inefficient when compared to radio transmission. Light can be blocked by opaque objects that might find their way between the flares (cars, people, cones, etc.). The range of transmission is limited due to energy requirements. Radio transmission provides a solution to these limitations. Using radio waves a flare could send digital or analog signals to other flares that identify its sequence in the pattern much in the same way as light could be used.

Sound transmission—Ultrasonic or other frequency sound can be used as a transmission media. Modulated sound waves could carry information defining flare number and location relative to other flares. In addition, sound waves diminish in strength in a relative and predictable way, the strength of the sound "heard" from two different flares at different distances would aid the microcontroller firmware in establishing which is farther away and what the sequence number is. In addition, once the sound is sensed by appropriate transducers and electronics the frequency could be filtered to eliminate noise produced by vehicles on the roadway.

4) Irrespective of the transmission media, the flares can be networked using a "mesh" network where information is transmitted between flares, up and down a group, without need for a master flare or slave flare, and where all communication is internal to the group of flares. No external signal is required, but could be used to remotely control the group of flares. If one flare is turned on and it is in "range" of communication with only one flare, this second flare would then send the "state" to any other flares within range. Similarly, the remote control unit needs to be in range of only one flare for the command to be distributed to all of the flares.

Control of Direction of Warning Light Emitted by the Flare and Energy Conservation:

To be practical roadside flares must be small and lightweight. An individual might deploy 10 flares on the roadside and stowing 10 objects in a vehicle requires small size. Small size and light weight define limits on the battery size and available energy. Hence, methods to reduce energy consumption are key factors in designing a roadside flare. One method is to turn off (not illuminate) LEDs oriented in a direction not seen by on-coming vehicles. All existing roadside flare designs power all LEDs with each flash. An approach that would reduce significantly the energy required and prolong battery life is to sense the direction of traffic flow. This can be done using light from on-coming headlights, sound intensity, sound frequency (Doppler Effect of a passing vehicle), thermal detection of engine heat, radar, ultrasound, sonar, and air pressure. When the direction of traffic is detected, the microcontroller will turn off LEDs that would illuminate the "back" side of the flare.

In a similar fashion, the flares can be mounted in a vertical position (as opposed to horizontal on the road surface). This vertical orientation might be used when magnetically attaching the flare to the tail-gate panel of a truck or the side of a vehicle. As the flare is designed for light output in the horizontal plane (on the road surface), when placed vertically much of the light energy would be directed towards the sky, ground, and left and right. Accordingly, a sensor could detect the "tilt" using an accelerometer, gyroscope, MEMS device, mechanical ball tilt sensor, thermal tilt sensor, light detecting tilt sensor, etc. and send this information regarding orientation angle to the microcontroller. The microcontroller, "aware" of the angle of tilt, would choose which LEDs to illuminate (for example, the side LEDs when horizontal and "top" LEDs when mounted vertically on its side or magnetically attached to the tail gate of a vehicle). This dynamic choice of LED to illuminate based upon angle of tilt maximizes light output in the direction of approaching traffic and minimizes unnecessary battery consumption associated with lighting LEDs not visible to oncoming traffic. When placed in the vertical plane the side lights could be turned off and LEDs located in the top of the flare directed towards on-coming traffic could be turned on.

Optional Features to Facilitate Deployment and Retrieval of Roadside Flares:

Motion-Actuated or Percussion-Actuated On/Off Feature: In some instances, such as during nighttime operation in areas which are not well lit, it may be difficult to see standard buttons on the surface of an enclosure. Rather than using a discrete on/off switch such as a capacitance button or other specifically-located actuator to cause the flare to begin emitting light (i.e., "turn on") or cease emitting light (i.e., "turn off"), the flares of the present invention may optionally be equipped with an on/off switch which is activated by a motion or percussion sensor, such as an accelerometer, tilt sensor, gyroscope or MEMS (micro electrical mechanical system) set to detect a particular movement of, or percussion (e.g., tapping) on the flare. For example, the electronic circuitry of the flare may be adapted so that rapid partial rotation of the flare in a first (e.g., clockwise) direction causes the flare to turn on and subsequent rapid partial rotation of the flare in the opposite (e.g., counterclockwise) direction causes the flare to turn off. Alternatively, on and off might be triggered by turning the flare upside down, or via some other motion or percussion. As a further example, percussing (e.g., tapping or rapping) the flare with the palm of the operator's hand could be used as a trigger to turn the flare off or on, with the sensor "tuned" to exclude normal vibration to be expected during transport and storage. For example, the circuitry may be adapted to recognize a specific number of consecutive percussions (e.g., three consecutive taps or raps) as the signal to cause the flare to initially turn on or subsequently turn of. Alternatively or additionally, to avoid unintended turn on of the flare, which could result in rapid unintentional depletion of the battery, a 3-axis accelerometer may be used to detect acceleration in the X, Y, and Z axis. For example, simply turning the flare over three times within a defined period (e.g., 3 seconds) would result in the Z-axis experiencing a swing from +9.8 meters per second per second (+1G) to −1G. The microcontroller would receive this information from the accelerometer via an interrupt signal. This pre-programmed "gesture", stored in the accelerometer, would generate an interrupt from the accelerometer, and this interrupt would "wake" the microcontroller from a low-power "sleep" mode. Hence, the microcontroller can be in a low-power state (sleep) while the device is off. The accelerometer has sufficient intelligence to recognize the pre-programmed gesture and wake the microcontroller from its low power mode. The pre-programmed gesture must utilize the X, Y, and Z axis to insure proper turn-on but avoid false startup. When horizontal, the X and Y axis experience 0 (zero) acceleration. Only the Z axis is experiencing +1G. However, if the surface is bumped up and down the accelerometer would experience acceleration on the Z-axis only and this could mimic turning the flare over to the other side. Thus, the flare would turn on if three bumps of sufficient magnitude occurred within the allotted time period.

To avoid this false trigger, X- and Y-axis information is introduced. A simple bounce of the horizontally-oriented flare in the trunk of the car would be interpreted as turning over of the flare (Z-axis would transition from +1G to −1G). If X- and Y-axis changes were expected as well, then vertical displacement alone would not falsely turn on the flare. For the Z-axis to experience +1G to −1G, X- or Y-axis must transition from 0G to +1G (or −1G) to 0G. Introducing the Boolean—(Z-transition AND ((X-transition from 0G to +/−1G to 0G) OR (Y-transition from 0G to +/−1G to 0G))) eliminates "bumps" alone as a triggering event.

Group On/Off Feature: Some embodiments of the invention may be equipped with a group on/off feature whereby turning off any one of the flares would turn off all of the flares in the group. Using radio, sound, light, etc., to transmit information between flares one could send a message from any one flare to the remainder of flares within proximity. This message could be used to turn off all of the flares by simply turning off any single flare.

The ability to turn all of the flares off by turning off a signal flare allows the operator to retrieve the flares from the roadside while they are still flashing. This would reduce the likelihood that a flare would be inadvertently left behind on the dark roadway. In addition, when placed into a transparent or translucent case or satchel the flashing group of flares would represent a warning beacon to oncoming traffic that the operator is on the side of the road. When all of the flares have been retrieved, the operator could enter the safety of their vehicle or exit the roadway and turn off any one flare. The entire group of flares would extinguish. The operator does not have to turn off all of the flares individually.

Elevation of the LED above the road surface may vary as a function of position in the string. To aid in providing direction and visibility, the height of the LEDs providing illumination could vary. For example, in a 10 flare string flashing in sequence, the height above the road surface of number 1 could be 3 inches, with each flare progressing in height by 6 inches. As a result, the last flare in the string might be 5 feet above the road surface (on a flexible stalk). This would add additional perspective for a driver from a distance, offering linear as well as elevation cues to the hazard ahead.

Locking Feature: With LEDs aimed in specific directions, including vertically towards the sky, the flare is designed to purposely illuminate the inside of a container, barrel, cone, or delineator. When placed on the road surface under a traffic cone, barrel, delineator, etc., light emanating from the flare in the vertical direction efficiently illuminates the container. However, light aimed vertically when the flare is on the road surface and not placed under a container leads to inefficiency of energy use as this light is directed skyward. Dynamic switching of side versus top (vertical) LEDs is accomplished using a tilt sensor (accelerometer) and the information the sensor provides to the microcontroller. It is necessary, when placed under a container, to override the tilt sensor. The user must be able to "lock" the choice of LEDs (top or side) for a particular deployment. This effectively disables dynamic, tilt-sensing microcontroller control of the LED choice.

The "locking" feature can be activated by pressing two buttons simultaneously, or by pressing and holding one button for a prolonged switch closure (2 seconds or more, for example). Alternatively, a single tap of a button could lock the orientation of LED illumination, or step through choices such as a single press turns on the side LEDs, a second press turns on the top LEDs, a third press turns on both side and top LEDs, and the cycle repeats itself with additional presses of the button.

Motion Actuated LED Switching, dynamic switching of LED orientation using a tilt sensor or accelerometer, locking of LED orientation using various user interface button presses, all can be implemented in either a standalone flare or one communicating with its neighbors.

All of the features described thus far, save for the "group off" capability, can be incorporated in either: a "smart flare" that incorporates mesh or flocking technology (radio frequency, light transmission, infrared transmission, sound, transmission, etc.) for flare-to-flare communications or in a "dumb" flare used individually or in a group wherein the flares do not communicate with each to synchronize their flashing, but rather flash randomly in non-synchronized fashion.

FIGS. 1 through 7 show one a non-limiting example of a flare 10 of the present invention. FIGS. 10A through 10D are electrical circuit diagrams for this embodiment of the flare 10 and Appendix A sets for a component list that corresponds to the electrical diagrams of FIGS. 10A through 10D. having a generally rectangular configuration with rounded corners. This example is non-limiting and other alternative configurations or shapes may be used. The flare 10 of this example comprises a top wall 12, bottom wall 14 and side wall 16. The side wall 16 is translucent. Also, in this example, translucent windows are formed about a central portion 21 of the top wall 12. In some embodiments, the entire or substantially all of the top wall 12 may be translucent. Also, in some embodiments the bottom wall 14 may be entirely or substantially non-translucent or devoid of any locations where light is directed from or through the bottom wall.

Defined within the walls of the flare 10 is an interior area which houses a battery, electronic circuitry and a plurality of LEDs. Some of the LEDs (i.e., side-emitting LEDs) are positioned to direct emitted light through the translucent side wall 16 so that light is projected around (e.g., 360 degrees) the flare 10. FIG. 9 shows an example of how the side-emitting LEDs may be positioned to cast their light through the side wall 16 such that the light will be visible 360 degrees around the flare 10. Also, in some embodiments, the side-emitting LEDs may be slightly angled upwardly such that the emitted light will rise from the flare 10 when the flare is positioned bottom-side-down on the ground or roadway surface. For example, if the side-emitting LEDs are angled 5 degrees above horizontal, light from the side-emitting LED's will be clearly visible to motorists approaching from a distance of about 120 feet.

Other LEDs (i.e., top-emitting LEDs) are positioned to direct light through the translucent windows 23*a*, 23*b*, 23*c*, 23*d* in the top wall 12 of the flare 10. On the top wall 12 of the flare 10 are a control button 18, a power button 20, a small green indicator LED 22*a* and a small red indicator LED 22*b*. The control button 18 is also referred to herein as the pi (π) button. The bottom wall 14 may be fully, substantially or at least partially opaque or non-translucent. A portion of the bottom wall 14 comprises a battery compartment cover 30 which is held in place by latches 28. When it is desired to access or change the battery or batteries, the latches 28 may be opened and the battery compartment cover 30 removed. In the embodiment show, four (4) AA cell batteries are positioned inside the device under the battery compartment cover 30. Other alternative power sources, including solar collectors and/or rechargeable batteries, may be used instead of the standard AA cell batteries of this embodiment.

Figure 9A:
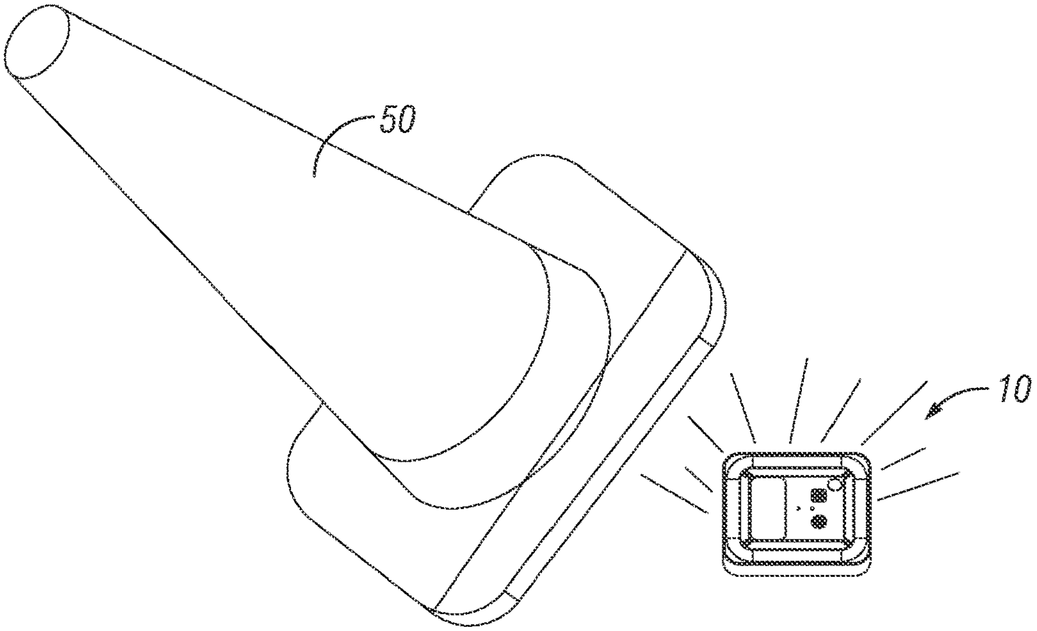
FIGS. 9A and 9B show steps in a method for using the flare device of FIGS. 1-7 for internal lighting of traffic cones.
Figure 9B:
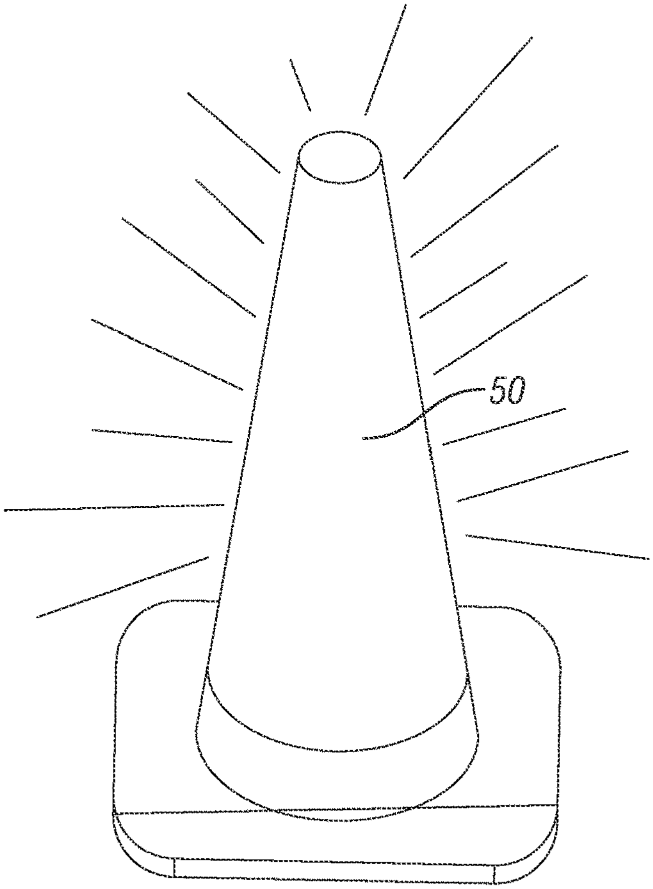
Figure 10A:
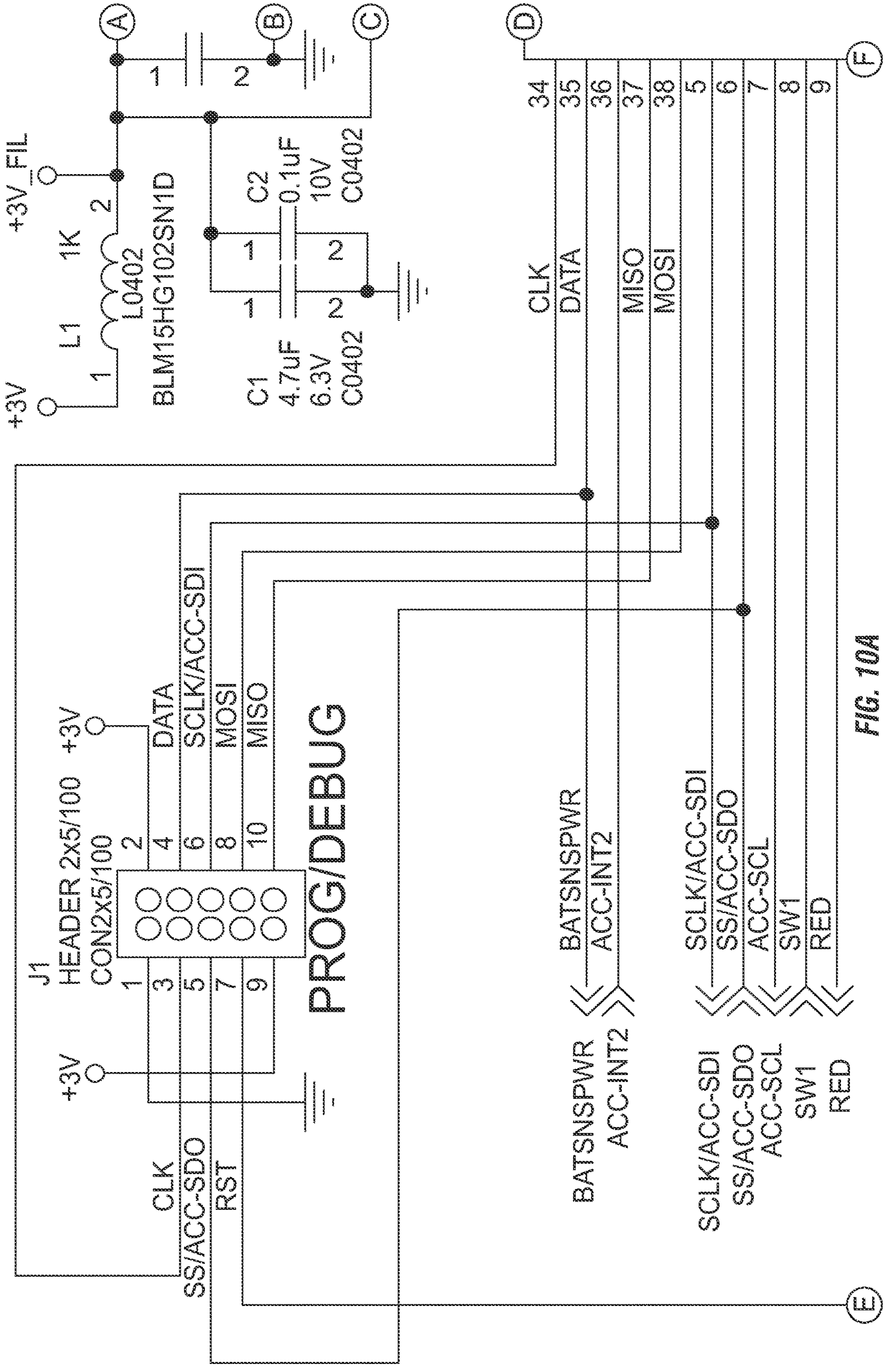
FIGS. 10A through 10D are electrical diagrams of components of the flare device of FIGS. 1 through 7. Accompanying Appendix A lists components shown in the diagrams.
Figure 10A:
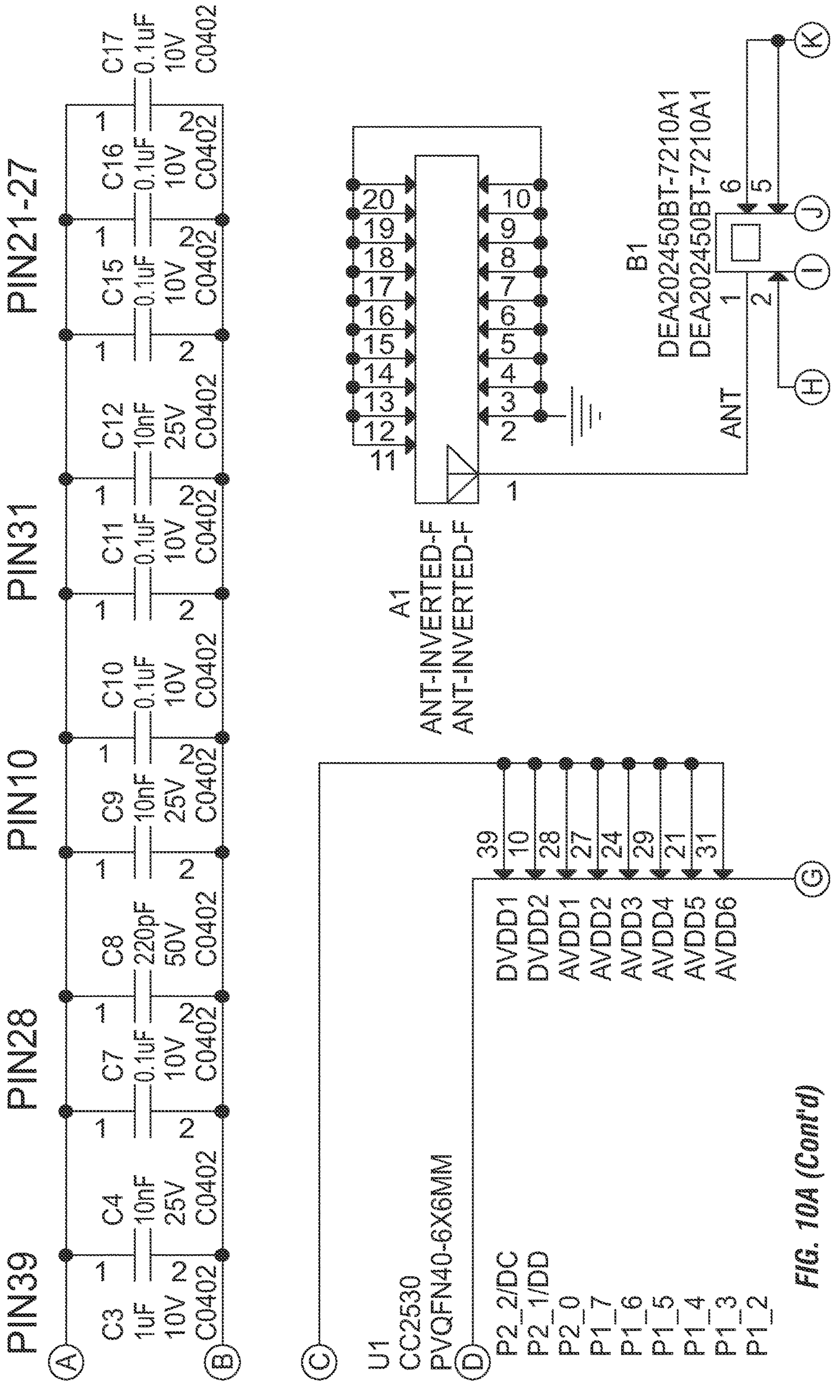
Figure 10A:
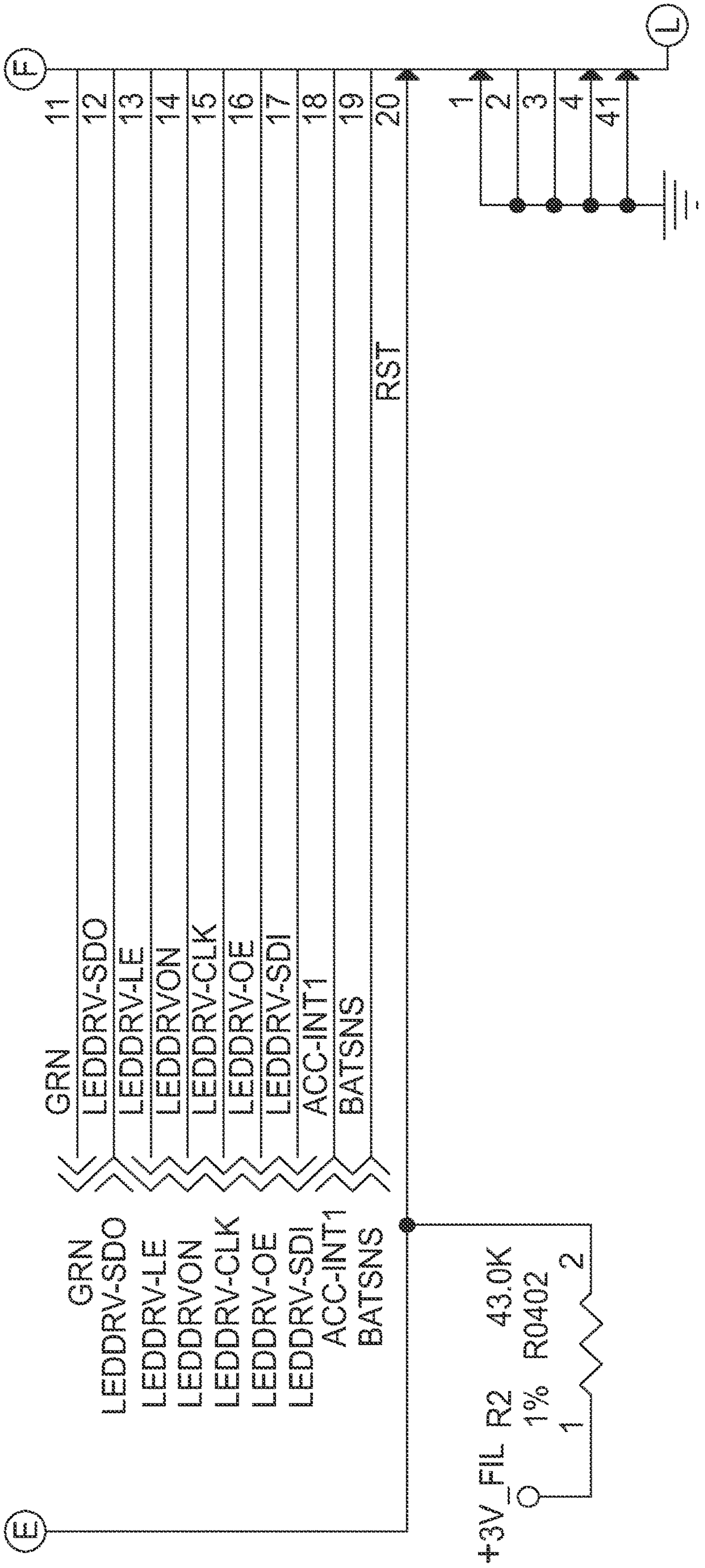
Figure 10A:
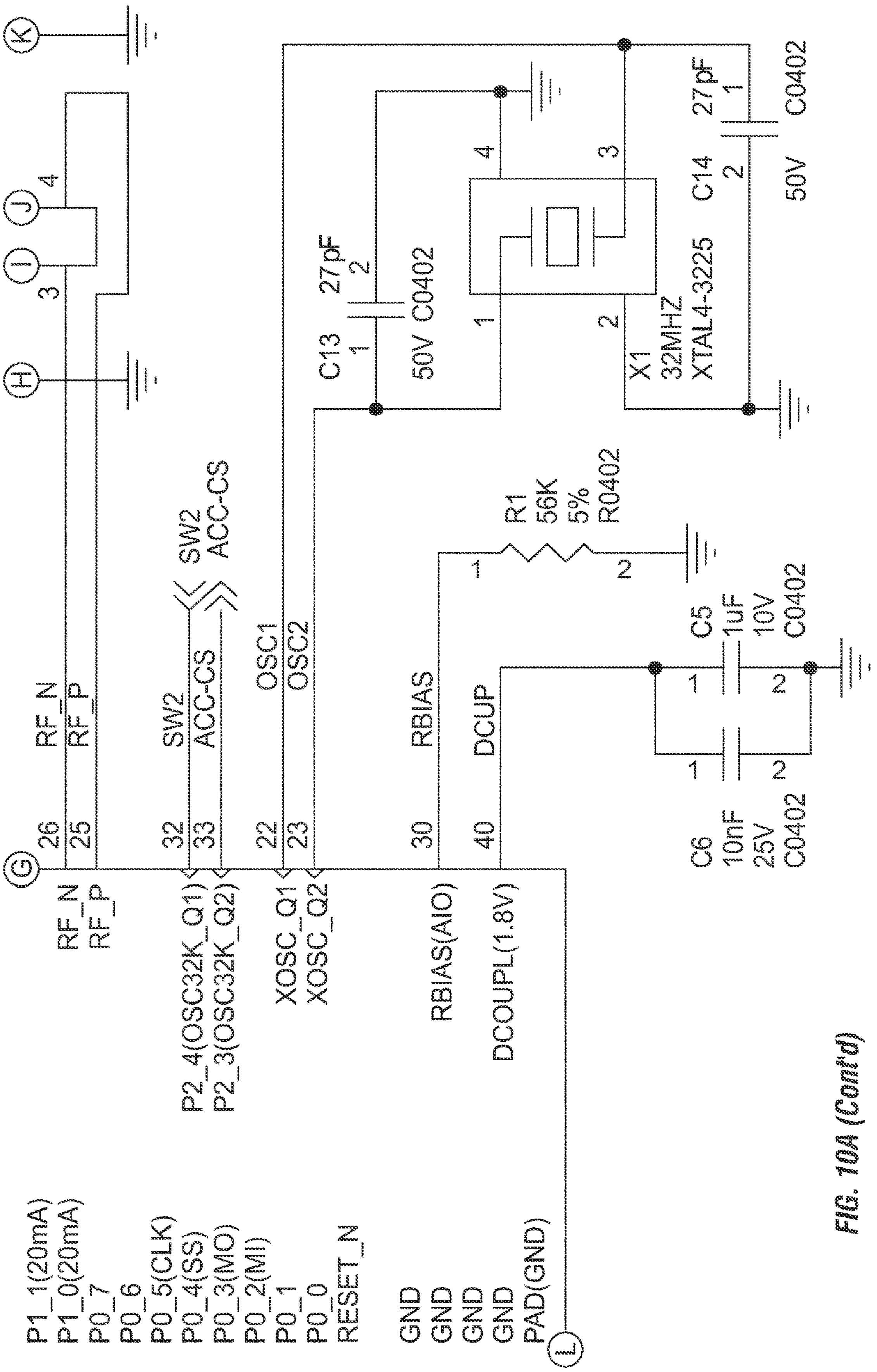
Figure 10B:
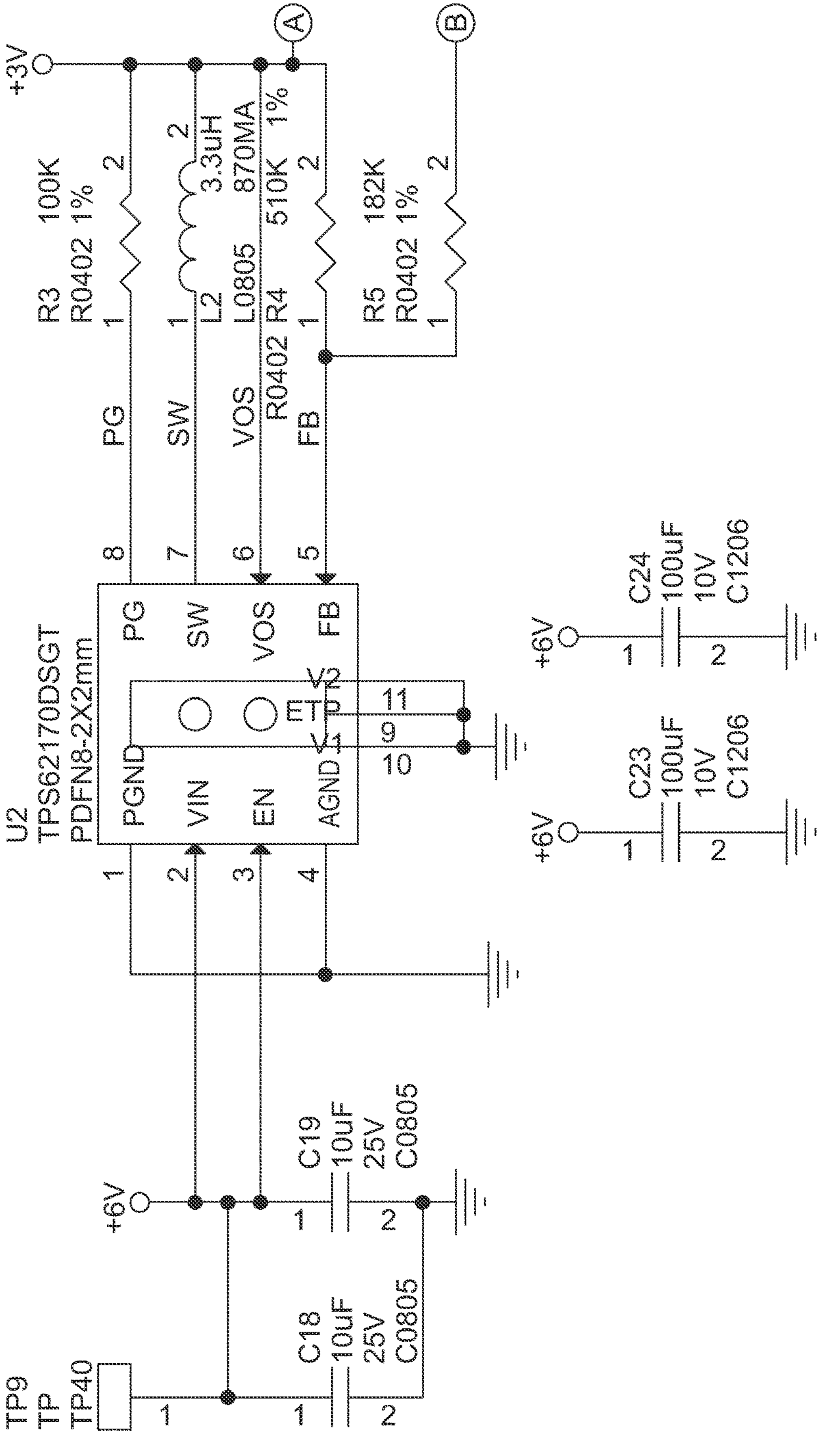
Figure 10B:
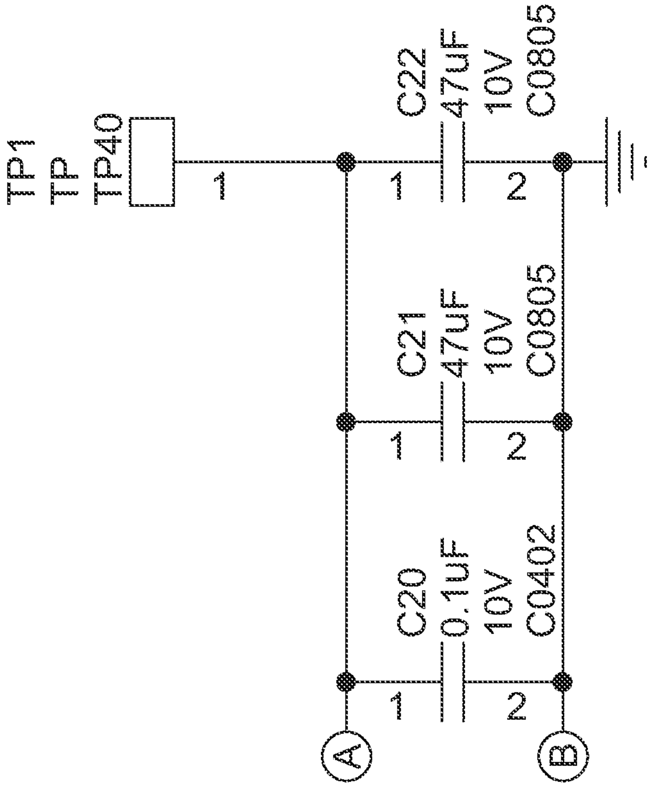
Figure 10B:
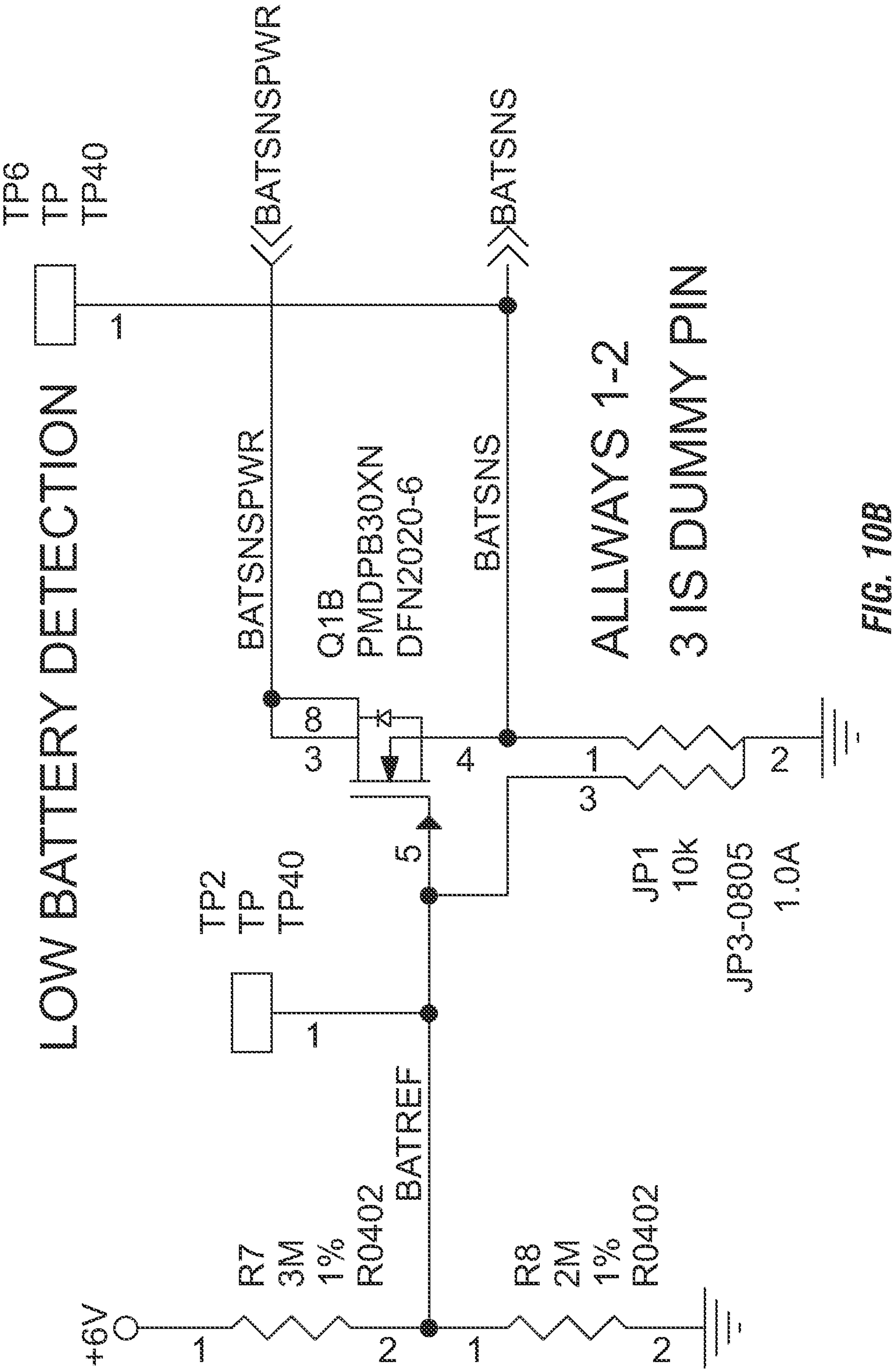
Figure 10B:
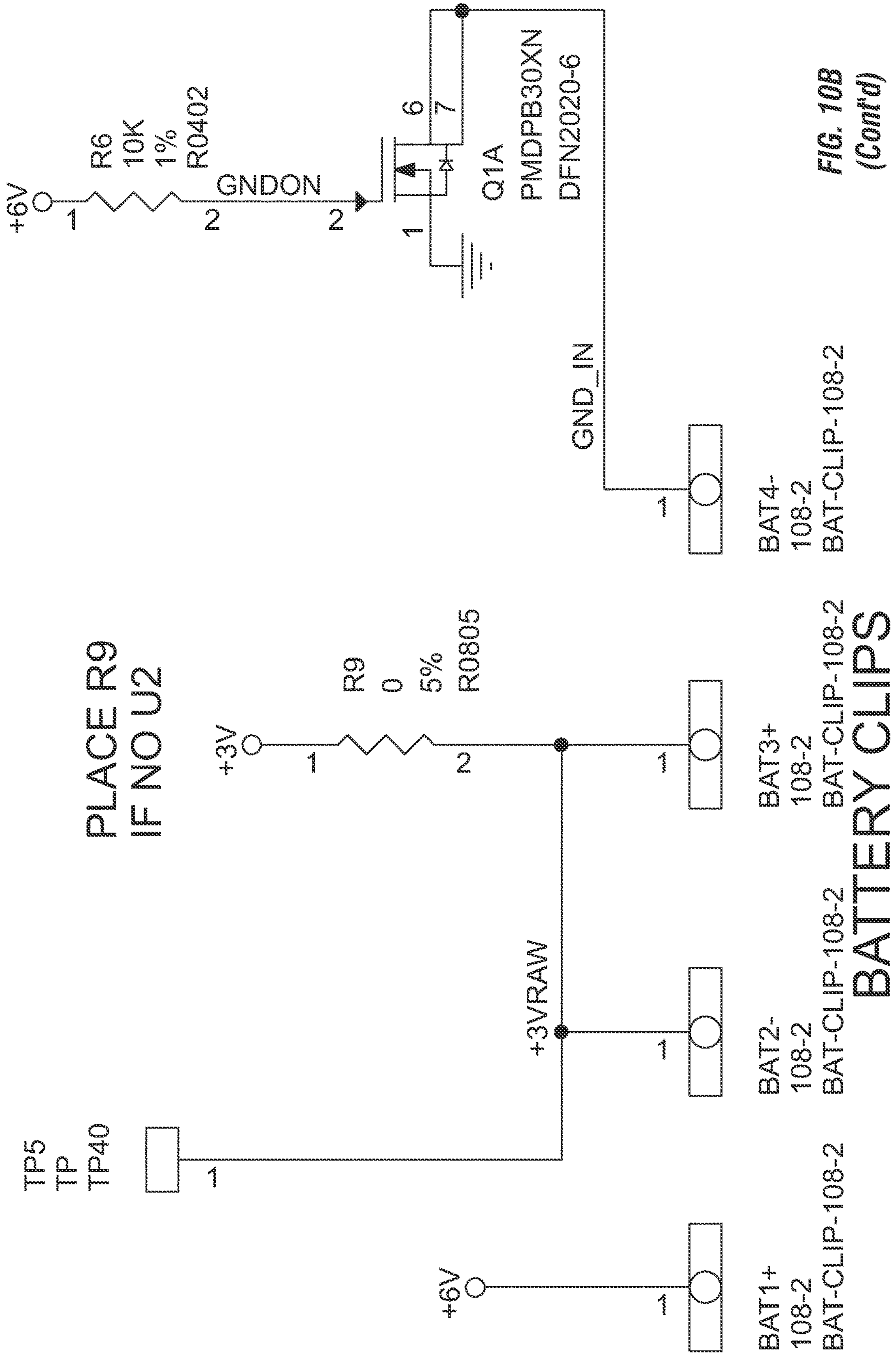
Figure 10C:
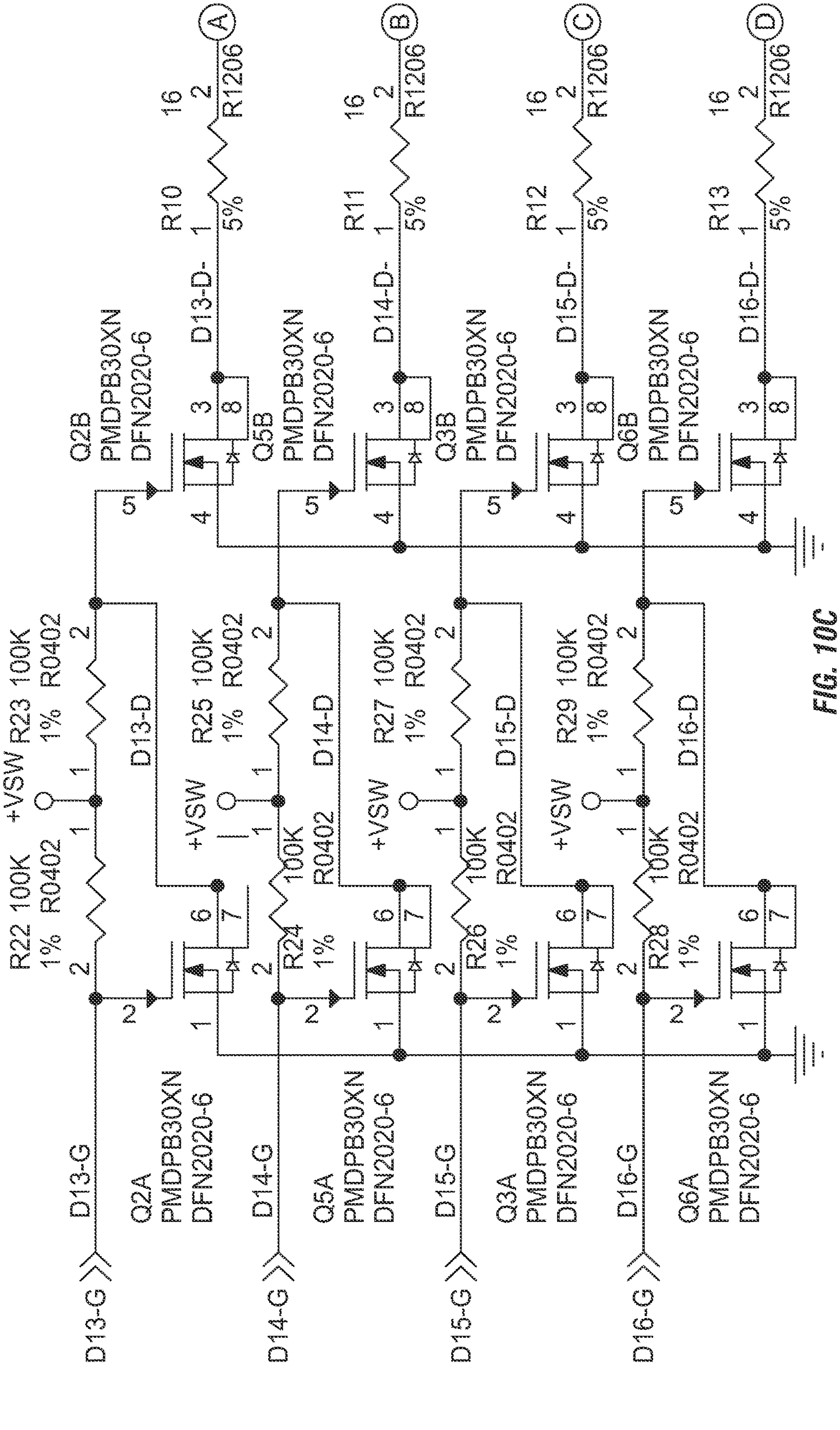
Figure 10C:
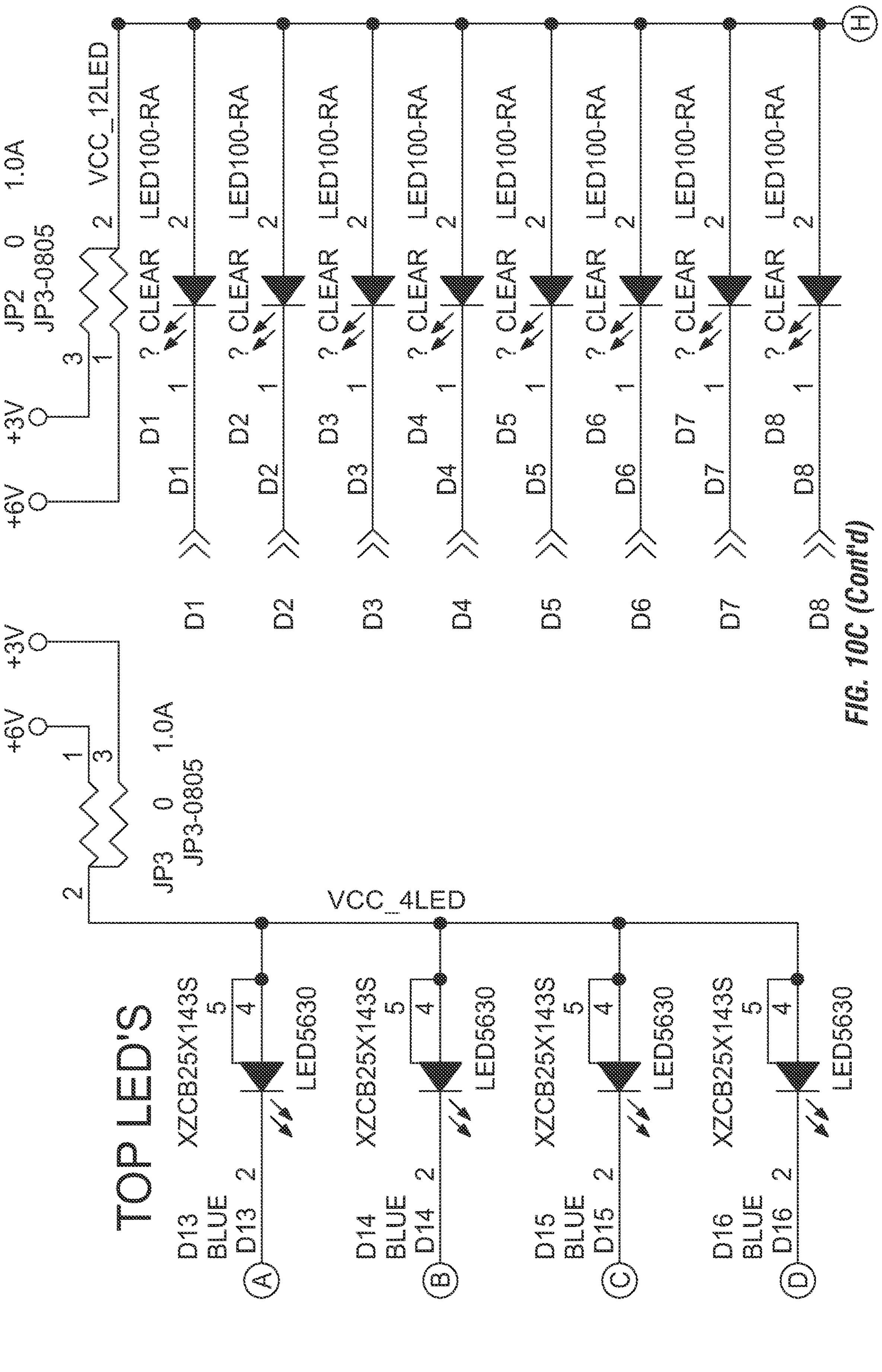
Figure 10C:
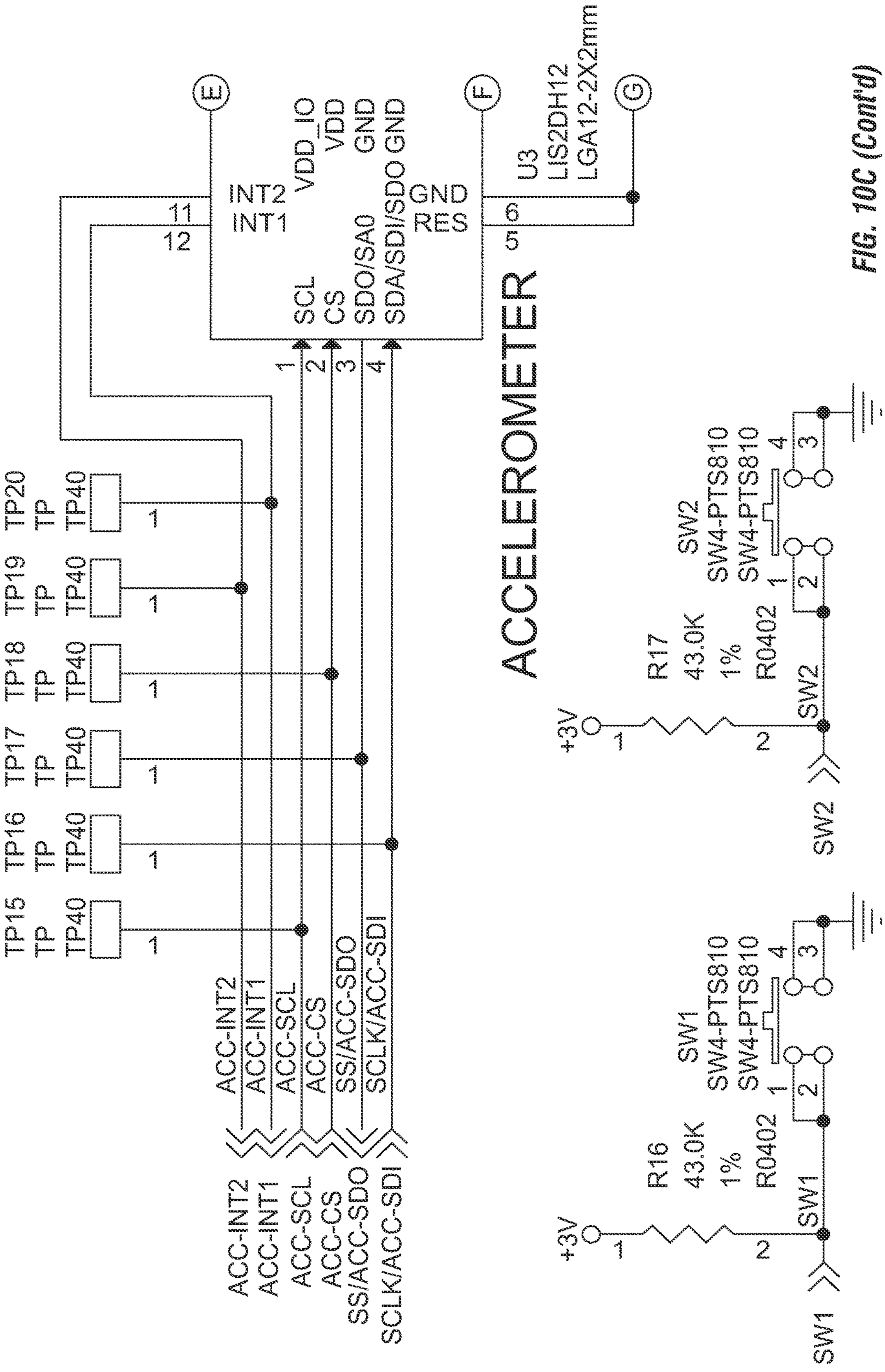
Figure 10C:
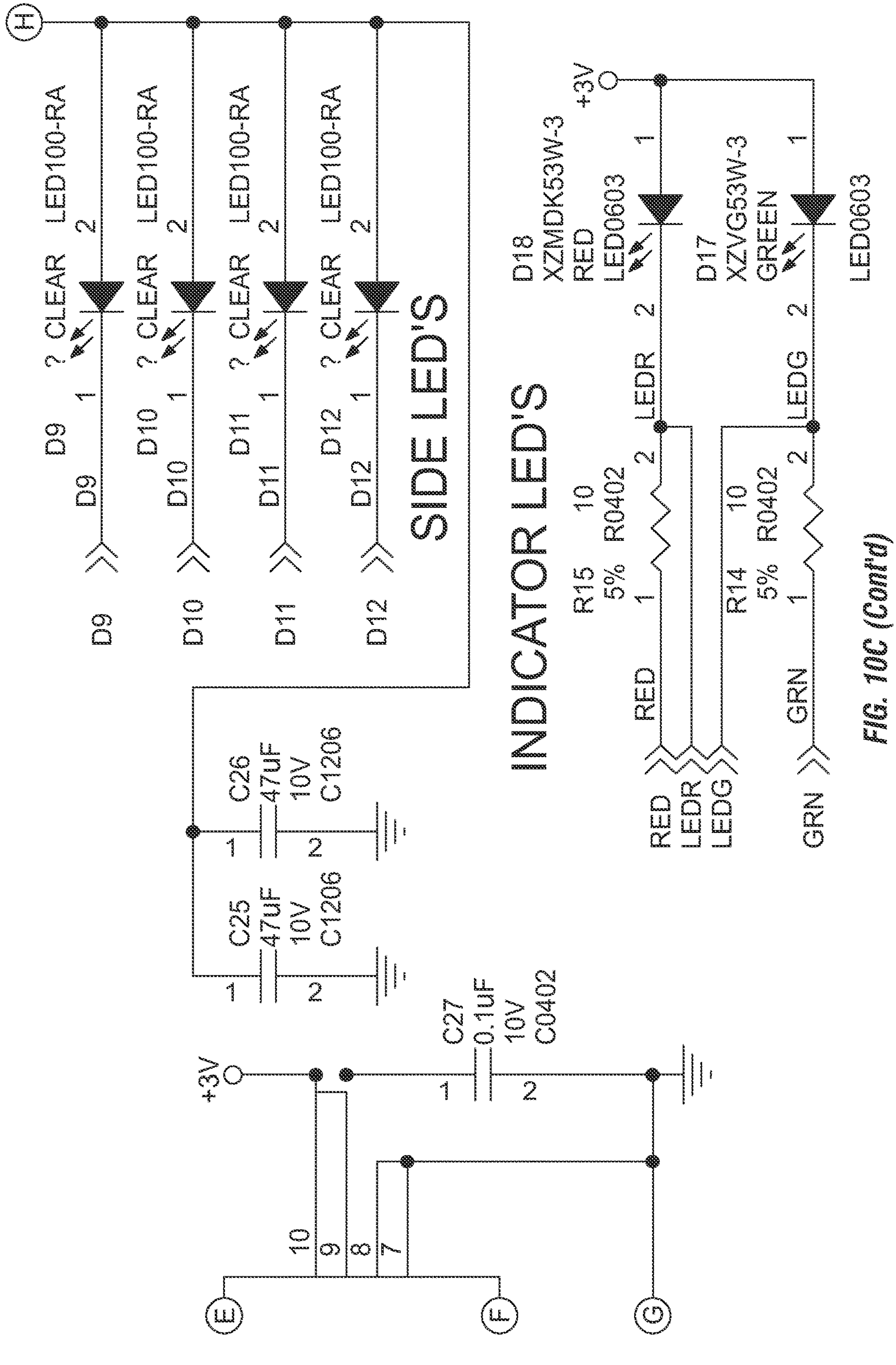
Figure 10D:
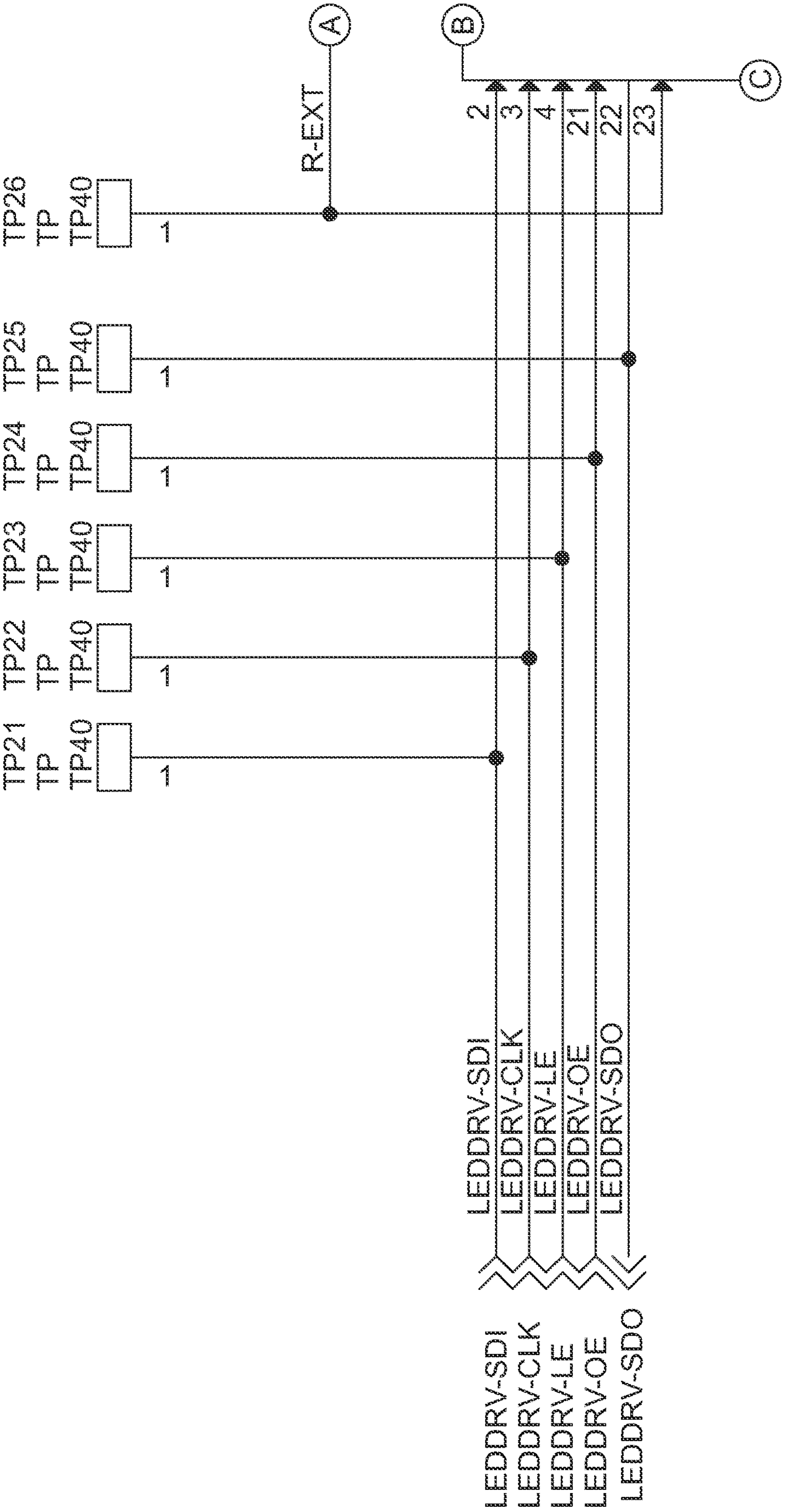
Figure 10D:
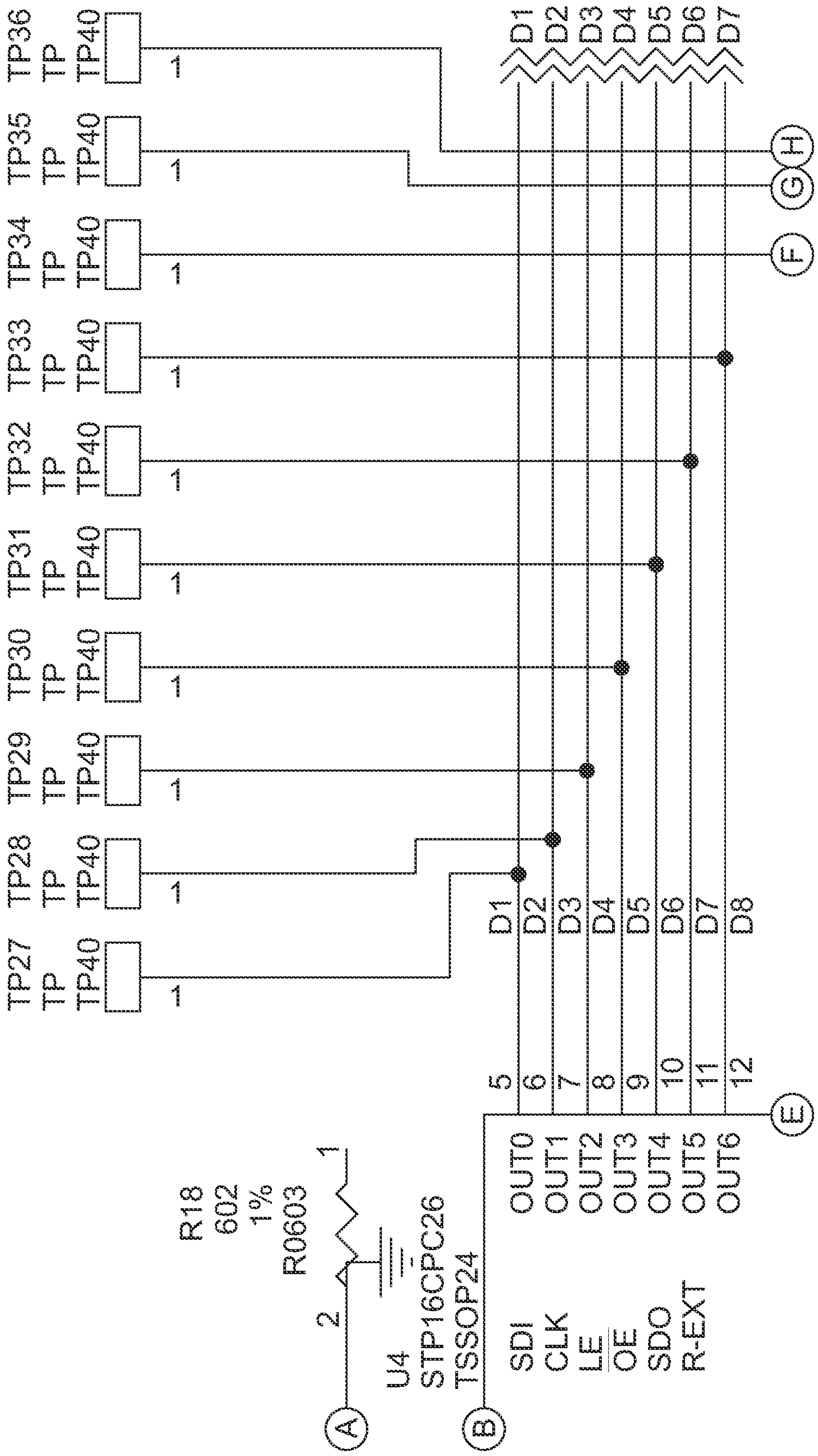
Figure 10D:
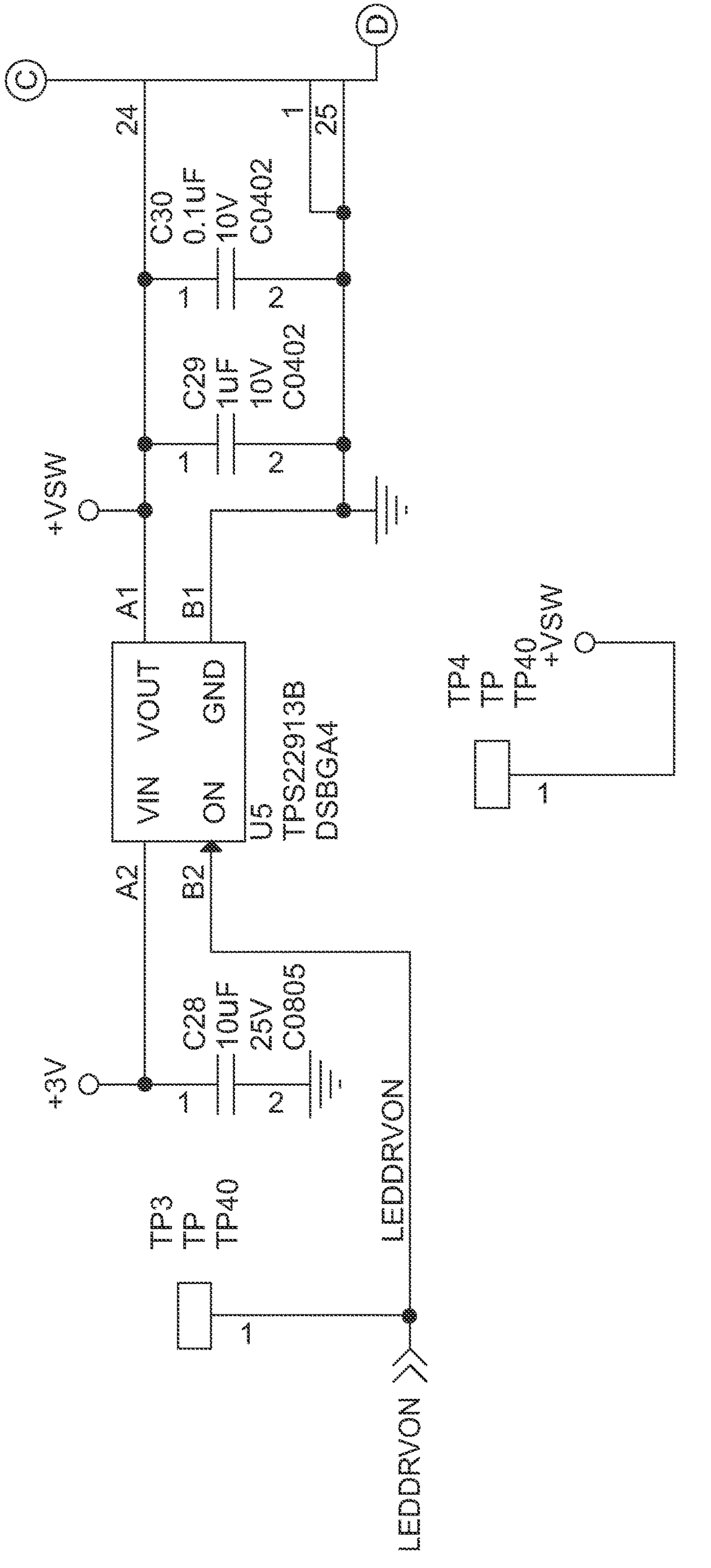
Figure 10D:
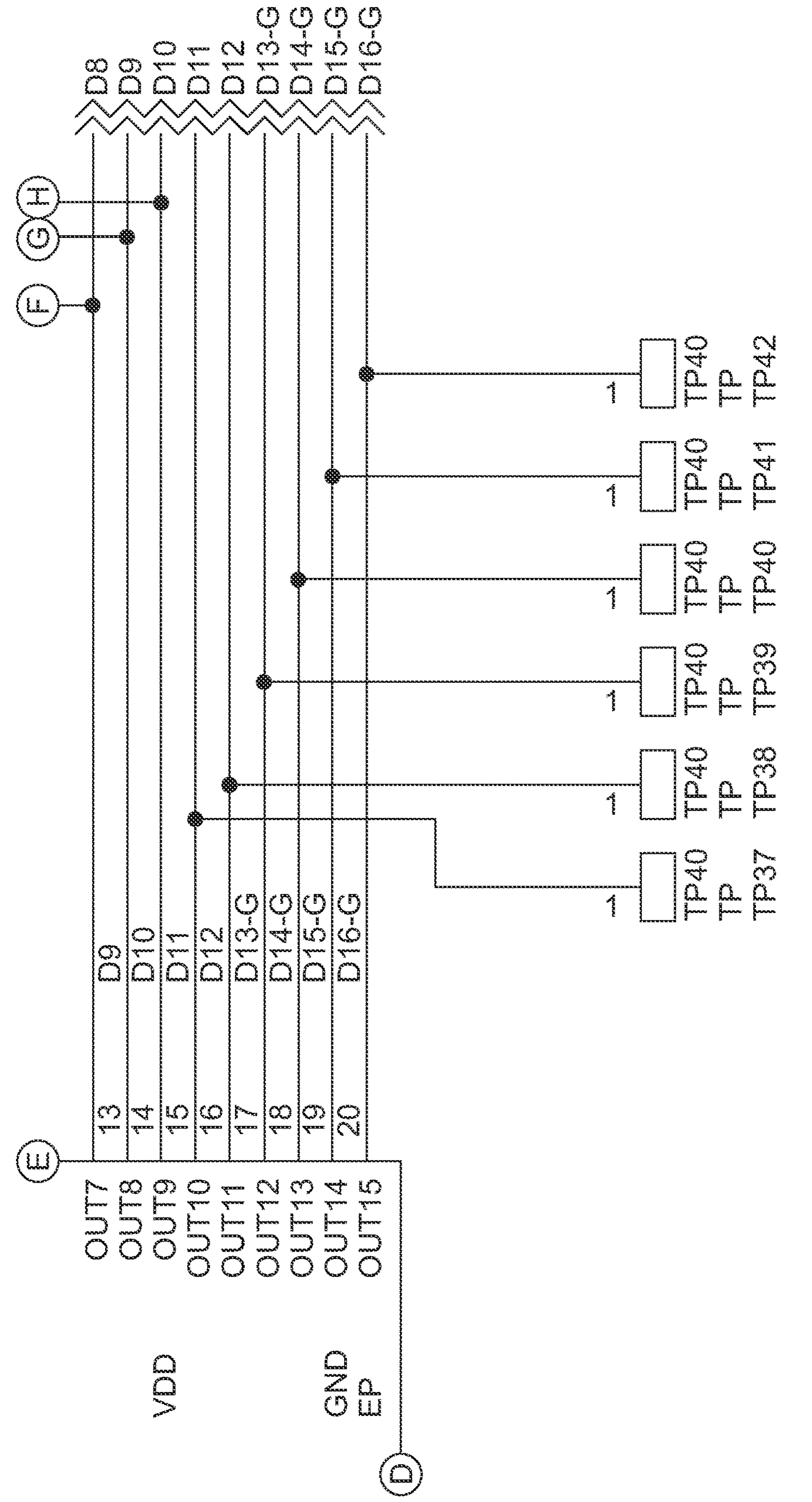

FIGS. 9A and 9B show steps in a method for using the flare device 10 of FIGS. 1-7 for internal lighting of a traffic cone 50.

The following paragraphs describe possible methods of use of a plurality of these flares 10 in a group (e.g., a row or array).

Turning on the First Flare: To turn on the first flare 10 of the group, the power button 20 is briefly depressed or tapped. Once the power button is pressed a steady green LED 22*a* on the top wall 12 will illuminate. This indicates that the flare and radio are powering up. The first flare 10 will take approximately 4 seconds to turn on. At the end of the 4 seconds the green LED will disappear and, if the flare 10 is positioned horizontally, 12 side-emitting LEDs will emit flashing light directed through the side wall 16. Alternatively, if the flare is positioned vertically, 4 bright top-emitting LEDs will emit flashing light through the top wall windows 23*a*-23*d*.

Turning on additional flares: Once the first flare 10 is on and flashing, the operator may briefly depress (e.g., tap) power button 20 of another flare in the group. Similar to the first flare 10, once the power button 20 is pressed a steady green LED will illuminate on the top wall 12 of the second flare 10, indicating that the second flare is powering up. This second flare 10 will take about 1 second to turn on. At the end of the 1 second period the green LED will disappear and the side-emitting LEDs or top-emitting LEDs of the second flare 10 will begin to flash depending on the orientation (i.e., vertical or horizontal) of the second flare 10. Because the flares 10 have self-sequencing capability such as the above-described mesh network or flocking protocol, the 2nd flare 10 will automatically identify itself as the second flare in the sequence and will begin to emit flashes of light in sequence (i.e., a specific time after) flashes emitted from the first flare 10. This set up procedure is then repeated for the remaining flares 10 in the group. Each preceding flare 10 must be flashing (and this transmitting its sequence number) before turning on the next flare 10. For maximum range, each flare 10 may initially be held above the ground in line-of-site of the preceding flare when turning on, thereby ensuring that the flare 10 will receive the radio signal from the preceding flare without attenuation of the signal due to proximity to the ground.

Turning Off Flares: There are 2 ways of powering down the flares. 1) Single Flare Off—You can turn off a single flare by pressing and holding (2 seconds) the square pi (π) button. A red LED will flash twice indicating it has turned off; 2) Group Off—You can turn off the entire string of flares by simply holding down the Power button for 2 seconds. The red indicator LED flashes while the off command is being sent up and down the string. You must wait until the red LED stops flashing before turning a flare back on.

All of the flares in the group may be picked up all the flares and placed in a carry case while they are still flashing. This will help to prevent the user from inadvertently leaving inoperative flares on the side of the road. In addition, the carrying case may be constructed such that the flares flashing inside of the case will cause the case to illuminate thereby enhancing the ability of oncoming vehicle drivers to see and avoid a user who is carrying the case. When the use if safely in the user's vehicle or otherwise away from vehicular traffic, the user may then hold down the power button 20 on any one of the flares 10 in the case, thereby causing all of the flares 10 in the case to power off.

Remote Control of Flare Behavior: By virtue of the communication and network features of the flare, any communication between flares to pass along flash pattern, top versus side LED choice (for battery saving), on/off, sequence pattern (one flare marching, two flares marching, fast march, slow march, etc.) can be mimicked by a remote control device, Smart Phone app, cellular communication, infra-red controller, etc. Accordingly, the operator can turn and off the entire group of flares, control the operation, direction of flash, battery saving, flash pattern, amongst other features, from a distance away from moving vehicles and in the safety of their vehicle. They need not be close to flare number 1, as any flare in the mesh network or "flock" passes all commands to all flares in the network or "flock". The operator could be close to number 20 of 30 flares and control the entire network.

The ability to inhibit the LED flashing while maintaining radio communication is a key feature in battery savings. Law enforcement, for example, will set up an alcohol check point using flares to alert and guide approaching vehicles. They typically will set up the DUI check point several hours prior to actual beginning surveillance. If the flares were flashing during this entire period and the 8 hours of the active surveillance battery consumption would be excessive. However, with a remote control unit the operator could set up the flare pattern, test that they are flashing as desired, and then "inhibit" the flashing of the LEDs to save battery. The continuing radio communication maintains sequence numbers, patterns, direction of flashing LEDs, etc., and occurs during milliseconds each second and consumers little power. Hours later when the operator wishes to commence inspection of vehicles, she can simply tap a button on the remote control to turn on the flashing LEDs. It is the LEDs that consume the majority of battery capacity and this capability mitigates this cause of battery drain.

Battery Status Check: Pressing the pi button 18 while the flare 10 is off will effectuate a batter check. The green or red LED on the top wall 12 will flash the current battery status, as follows: 5 green flashes=full batteries, 4 green flashes=full batteries, 3 green flashes=good batteries, 2 red flashes=low batteries, 1 red flash=very low batteries. Preferably, in this embodiment, the batteries are replaced between the 3 green flashes and 2 red flashes.

Dynamic LED Orientation: In some embodiments, the flare 10 may be equipped with an accelerometer or gravity sensor, as discussed above and the accelerometer or gravity sensor may be operative to sense the current orientation (i.e., horizontal or vertical) of the flare 10 and to cause either the top-emitting or side-emitting LEDs to emit light, depending on which orientation is sensed. When the flare 10 is in the horizontal orientation (lying flat on the ground) the 12 side-emitting LEDs will emit flashes of light through the translucent side wall 16. When the flare 10 is in the vertical orientation (e.g., e.g., when magnetically attached to the back of a truck tailgate) the 4 top-emitting LEDs will emit flashes of light through the top wall windows 23*a*-23*d*. Unless the locking feature is engaged, the flare 10 will default to a "dynamic positioning" mode wherein the accelerometer or gravity sensor will cause the flare 10 to automatically switch back and forth between side emitting mode and top emitting mode as the flare 10 undergoes changes between horizontal and vertical orientation.

Locking Feature/Override of Dynamic LED Orientation: In this example, the flare 10 is equipped with the above-described locking feature which overrides the default dynamic positioning mode of the flare 10. Use of this locking feature allows the flare 10 to be locked in top-emitting mode so that it will continue to emit flashes of light directed through the top wall windows 23*a*-23*d* even when the flare 10 is placed in a horizontal orientation. To trigger this locking feature, after the flare 10 has been powered up and is flashing in either the horizontal or vertical mode, the pi (π) button 18 is pressed. Pressing the pi button 18 one time while the flare 10 is operating overrides the dynamic LED orientation and causes the flare 10 to be locked in top-emitting mode with the bright top-emitting LEDs emit flashes of light through the translucent windows 23*a*-23*d* in the top wall 12 of the flare 10 and the side emitting LED off. The green indicator LED 22*a* will flash once to indicate that the flare is locked in the top emitting mode. Pressing the pi (π) button 18 a second time will cause the flare 10 to transition to and become locked in side-emitting mode, wherein the side-emitting LEDs emit light through the side wall 16 and the brighter top-emitting LEDs are turned off. The green indicator LED 22*a* will then flash twice to indicate that the flare 10 is now locked in side-emitting mode. Pressing the pi (π) button 18 a third time will disengage the locking feature and restore the flare 10 to its default dynamic LED orientation mode. The green indicator LED 22*a* will flash three times to indicate the flare is now in the default state.

Patterns: Once a plurality of the flares 10 are operating, the user has the option of choosing between 5 flashing patterns. To change patterns, the operator simply taps (does not hold) the power button 20 on one of the flares 10 in the group. This will cause the flare to cycle through a series of available flashing patters, e.g., Pattern 1 (default), Pattern 2, Pattern 3, Pattern 4, Pattern 5, and back to Pattern 1. In this example, the default Pattern 1 is a bright, slow and smooth pattern. Pattern 5 is a fast pattern, Pattern 2 is two flares 10 flashing as a pair and marching down the string of pared flares, and Pattern 3 is two flares flashing separated by a non-flashing flare, thereby spacing the flash out. Pattern 4 is a tail-off flash pattern. Once one of the flares 10 in the group is changed to a non-default flash pattern, all of the remaining flares 10 in the group will then self-synchronize to that selected flash pattern due to the mesh network or flocking protocol used, as described above.

Changing Batteries: In this example, no tools are required to open the battery compartment to change the batteries. The battery cover latches 28 may be manually moved to their open positions and the battery cover 30 may then be removed to access the battery compartment.

Multiple Groups: Should the operator wish to use several strings or groups of flares 10 in close proximity, the flares 10 can be assigned to specific groups and set to different group frequencies. Flares in each group may be may bear identifying marks (e.g., yellow, blue green, beige, or black dots) to indicate different groups. For example, different police units might carry different group numbers so that they do not interfere with each other when deployed in close proximity.

It is to be appreciated that, although the invention has been described hereabove with reference to certain examples or embodiments of the invention, various additions, deletions, alterations and modifications may be made to those described examples and embodiments without departing from the intended spirit and scope of the invention. For example, any elements, steps, members, components, compositions, reactants, parts or portions of one embodiment or example may be incorporated into or used with another embodiment or example, unless otherwise specified or unless doing so would render that embodiment or example unsuitable for its intended use. Also, where the steps of a method or process have been described or listed in a particular order, the order of such steps may be changed unless otherwise specified or unless doing so would render the method or process unsuitable for its intended purpose. Additionally, the elements, steps, members, components, compositions, reactants, parts or portions of any invention or example described herein may optionally exist or be utilized in the absence or substantial absence of any other element, step, member, component, composition, reactant, part or portion unless otherwise noted. All reasonable additions, deletions, modifications and alterations are to be considered equivalents of the described examples and embodiments and are to be included within the scope of the following claims.

What is claimed is:

1. A method for using a plurality of signal emitting devices to mark an emergency or temporary landing location for an aircraft, said method comprising the steps of:

a) providing or obtaining a plurality of signal emitting devices, each of which comprises a top, a bottom, at least one side, at least one top light emitter which emits light from the top, at least one side light emitter that emits light from said at least one side, a battery, control circuitry and radio communication apparatus;

b) positioning the signal emitting devices bottom side down at locations which delineate or mark the landing location; and, c) causing the signal emitting devices to operate such that:

each of the signal emitting devices receives radiofrequency signals from at a neighboring one of said signal emitting devices; and the control circuitry of each signal emitting device uses the radiofrequency signals that it receives to cause the light emitters of that signal emitting device to emit light in a synchronous flashing pattern with the others of said signal emitting devices, thereby marking said landing location wherein each signal emitting device is alternately operable in either i) a top emitting mode in which light is emitted from said at least one top light emitter, or a side emitting mode in which light is emitted from said at least one side light emitter during performance of this method; and, wherein at least some of the signal emitting devices are operated in top emitting mode during performance of this method.

2. A method according to claim 1 wherein:

others of the signaling devices are operated in side emitting mode during performance of this method.

3. A method according to claim 1 wherein;

said at least one side light emitter of each signal emitting device is configured to cast light from the side of the device at an angle upward from horizontal.

4. A method for using a plurality of signal emitting devices to mark an emergency or temporary landing location for an aircraft, said method comprising the steps of:

a) providing or obtaining a plurality of signal emitting devices, each of which comprises a top, a bottom, at least one side, light emitters, a battery, control circuitry and radio communication apparatus;

b) positioning the signal emitting devices at locations which delineate or mark the landing location; and, c) causing the signal emitting devices to operate such that:

each of the signal emitting devices receives radiofrequency signals from at a neighboring one of said signal emitting devices; and the control circuitry of each signal emitting device uses the radiofrequency signals that it receives to cause the light emitters of that signal emitting device to emit light in a synchronous flashing pattern with the others of said signal emitting devices, thereby marking said landing location;

wherein at least some of the signal emitting devices are placed bottom-side-down on the ground or a roadway surface and emit upwardly directed light perceivable by approaching aircraft;

wherein each signal emitting device has both top light emitters and side light emitters; and wherein each signal emitting device further comprises automatic top/side switching circuitry configured to automatically change between top emitting mode when placed in the vertical orientation and side emitting mode when placed in the horizontal orientation.

5. A method according to claim 4 wherein the top/side switching circuitry comprises an orientation sensor which senses whether the flare is in a horizontal orientation or a vertical orientation.

6. A method according to claim 4 wherein flares are configured to enable override the automatic top/side switching circuitry.

7. A method according to claim 4 wherein at least some of the signal emitting devices are placed in a horizontal orientation on the ground or a roadway surface and the automatic top/side switching circuitry is overridden, thereby causing light to be emitted in top emitting mode from the devices that are positioned in horizontal orientation.

8. A method according to claim 1 wherein the method is carried out to mark a temporary or emergency landing location on an open fields or highway.

9. A method according to claim 1 wherein the control circuitry of each flare includes a battery check circuit useable for checking battery status of the flare.

10. A method according to claim 1 wherein a remote controller is used to remotely control the signal emitting devices.

11. A method according to claim 1 wherein said synchronous flashing pattern comprises a pattern selected from:

flashing individually from a first device to a last in sequence;

flashing individually from last to first in sequence;

flashing two-flares at a time in sequence;

a plurality of flares flashing in sequence followed by a non-flashing flare followed by another plurality of flare flashing in sequence;

simultaneous flashing of all flares;

flashing in sequence with tail on;

flashing in sequence with tail off; and some flashing and some non-flashing.

12. A method according to claim 1 wherein the signal emitting devices communicate as a mesh network.

13. A method according to claim 1 wherein the method is carried out to create a temporary or emergency landing location for rotary aircraft.

14. A method according to claim 1 wherein the method is carried out to create a temporary or emergency landing location for fixed wing aircraft.

15. A method according to claim 1 wherein the method is carried out to create a temporary or emergency aircraft runway.

16. A method according to claim 1 wherein light emitters emit light in a visible range.

17. A method according to claim 1 wherein light emitters emit light outside the visible spectrum.

18. A method according to claim 1 wherein light emitters emit infrared light.

19. A method according to claim 1 wherein the signal emitting devices emit position indicating signals configured to be received by, and to interact with, a receiver in an approaching or departing vehicle.

20. A method according to claim 19 wherein the position indicating signals comprise Global Positioning System (GPS) signals.

21. A method according to claim 1 wherein some of the light emitting devices are operating in said top emitting mode and some of the light emitting devices are operating in said side emitting mode.

22. A method according to claim 4 wherein light emits from said at least one side light emitter in a direction that is angled upwardly from horizontal.

23. A method according to claim 6 wherein the top/side switching circuitry is overridden in at least some of the signal emitting devices so that those signal emitting devices will emit light in the top emitting mode.

* * * * *